United States Patent
Wu et al.

(10) Patent No.: US 10,925,038 B2
(45) Date of Patent: Feb. 16, 2021

(54) METHOD AND APPARATUS FOR DETERMINING TIME DOMAIN RESOURCE MAPPED BY REFERENCE SIGNAL

(71) Applicant: HUAWEI TECHNOLOGIES CO., LTD., Guangdong (CN)

(72) Inventors: Ming Wu, Shenzhen (CN); Chi Zhang, Shanghai (CN); Zhengwei Gong, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/401,740

(22) Filed: May 2, 2019

(65) Prior Publication Data

US 2019/0261367 A1    Aug. 22, 2019

Related U.S. Application Data

(63) Continuation of application No. PCT/CN2017/101293, filed on Sep. 11, 2017.

(30) Foreign Application Priority Data

Nov. 3, 2016    (CN) .......................... 2016 1 0959459

(51) Int. Cl.
| | | |
|---|---|---|
| *H04W 72/04* | (2009.01) | |
| *H04L 5/00* | (2006.01) | |
| *H04J 11/00* | (2006.01) | |

(52) U.S. Cl.
CPC ..... *H04W 72/0406* (2013.01); *H04J 11/0056* (2013.01); *H04J 11/0079* (2013.01);
(Continued)

(58) Field of Classification Search
CPC . H04J 11/0023–0093; H04J 2011/0003–0096; H04L 5/0001–26; H04W 72/005–14
See application file for complete search history.

(56) References Cited

U.S. PATENT DOCUMENTS

| | | |
|---|---|---|
| 2011/0255486 A1 | 10/2011 | Luo et al. |
| 2012/0002746 A1 | 1/2012 | Pham |

(Continued)

FOREIGN PATENT DOCUMENTS

| | | |
|---|---|---|
| CN | 102356574 A | 2/2012 |
| CN | 102648592 A | 8/2012 |

(Continued)

OTHER PUBLICATIONS

International Search Report dated Nov. 30, 2017 in corresponding International Application No. PCT/CN2017/101293.
(Continued)

*Primary Examiner* — Timothy J Weidner
(74) *Attorney, Agent, or Firm* — Leydig, Voit & Mayer, Ltd.

(57) ABSTRACT

Embodiments of the present invention provide a method and an apparatus for determining a time domain resource mapped by a reference signal, and relate to the field of communications technologies, to ensure correct data demodulation. The method includes: determining, by user equipment based on configuration information, a time domain resource mapped by a reference signal and/or a subcarrier spacing of the reference signal, where the configuration information includes predefined first configuration information and/or second configuration information sent by a base station. The method is applied to a scenario of determining the time domain resource mapped by the reference signal.

22 Claims, 10 Drawing Sheets

(52) U.S. Cl.
CPC .......... *H04L 5/0037* (2013.01); *H04L 5/0048* (2013.01); *H04L 5/0051* (2013.01); *H04L 5/0073* (2013.01); *H04L 5/0094* (2013.01); *H04W 72/04* (2013.01); *H04W 72/042* (2013.01); *H04W 72/0446* (2013.01); *H04W 72/0453* (2013.01)

(56) References Cited

U.S. PATENT DOCUMENTS

| | | |
|---|---|---|
| 2012/0213147 A1 | 8/2012 | Noh et al. |
| 2012/0320848 A1 | 12/2012 | Chen et al. |
| 2014/0341180 A1 | 11/2014 | Liu et al. |
| 2015/0222402 A1 | 8/2015 | Ouchi et al. |
| 2015/0304995 A1 | 10/2015 | Yi et al. |
| 2016/0112173 A1* | 4/2016 | Wang .................... H04L 5/0048 |
| 2019/0190675 A1* | 6/2019 | Takeda .............. H04W 72/0446 |

FOREIGN PATENT DOCUMENTS

| | | |
|---|---|---|
| CN | 103220791 A | 7/2013 |
| CN | 104782067 A | 7/2015 |
| KR | 101294815 B1 | 8/2013 |
| WO | 2014172876 A1 | 10/2014 |

OTHER PUBLICATIONS

Ericsson "Demodulation reference signal design principles" 3GPP TSG-RAN WG1 #86bin R1-1609767, Lisbon, Portugal, Oct. 10-14, 2016, total 4 pages.

International Search Report dated Nov. 29, 2017 in corresponding International Patent Application No. PCT/CN2017/101293 (7 pages).

Written Opinion of the International Searching Authority dated Nov. 30, 2017 in corresponding International Patent Application No. PCT/CN2017/101293 (6 pages).

* cited by examiner

METHOD AND APPARATUS FOR DETERMINING TIME DOMAIN RESOURCE MAPPED BY REFERENCE SIGNAL

CROSS-REFERENCE TO RELATED APPLICATIONS

This application is a continuation of International Application No. PCT/CN2017/101293, filed on Sep. 11, 2017, which claims priority to Chinese Patent Application No. 201610959459.3, filed on Nov. 3, 2016. The disclosures of the aforementioned applications are hereby incorporated by reference in their entireties.

TECHNICAL FIELD

This application relates to the field of communications technologies, and in particular, to a method and an apparatus for determining a time domain resource mapped by a reference signal.

BACKGROUND

With the continuous development of communications technologies, to adapt to services of different cells and improve a throughput of a communications system, a new generation communications system such as a communications system employing the fifth generation mobile communications technology (fifth-generation, 5G) may use a dynamic time division duplex (time division duplex, TDD) manner, a flexible duplex manner, or a full duplex manner to transmit data.

Currently, after receiving data, a base station and user equipment first need to perform channel estimation based on a reference signal (demodulation reference signal, DMRS), and then demodulate the received data based on a channel estimation result. A time domain resource of the DMRS is fixed, and different scenarios pose different requirements for transmitting data. Therefore, the fixed time domain resource of the DMRS may fail to meet requirements for transmitting data in different scenarios, possibly causing an error in data demodulation in some scenarios. For example, in a scenario of data transmission in the dynamic TDD manner, the flexible duplex manner, or the full duplex manner, directions of data transmission of two adjacent cells (for example, a cell 1 and a cell 2) on a same time domain resource may be different (for example, the cell 1 transmits uplink data, and the cell 2 transmits downlink data), and a frame structure used during transmission of the uplink data includes a guard interval (gap). Therefore, if the time domain resource of the DMRS is fixed, the two adjacent cells may transmit the DMRS by using different time domain resources. Consequently, interference occurs between a DMRS and data transmitted by one cell in the two adjacent cells and those transmitted by the other cell in the two adjacent cells, causing an error in DMRS demodulation, an inaccurate channel estimation result, and an error in data demodulation.

SUMMARY

This application provides a method and an apparatus for determining a time domain resource mapped by a reference signal, to ensure correct data demodulation.

To achieve the foregoing objectives, this application uses the following technical solutions:

According to a first aspect, a method for determining a time domain resource mapped by a reference signal is provided, and the method includes: determining, by user equipment based on configuration information, a time domain resource mapped by a reference signal and/or a subcarrier spacing of the reference signal, where the configuration information includes predefined first configuration information and/or second configuration information sent by a base station.

In this application, the user equipment can determine, based on the configuration information, the time domain resource mapped by the reference signal. Therefore, when user equipments in two adjacent cells both determine, according to the method for determining a time domain resource mapped by a reference signal provided in this application, a time domain resource mapped by an uplink reference signal or a time domain resource mapped by a downlink reference signal, in the two adjacent cells, time domain resources for sending uplink reference signals are the same, and time domain resources for receiving downlink reference signals are also the same. To be specific, interference does not occur between uplink data and an uplink reference signal in one cell in the two adjacent cells and downlink data and a downlink reference signal in the other cell. In this way, it can be ensured that base stations of the two adjacent cells correctly demodulate the uplink reference signal.

In this application, the user equipment can determine the subcarrier spacing of the reference signal based on the configuration information. Therefore, when an uplink reference signal of one cell in the two adjacent cells and a downlink reference signal of the other cell are mapped to different time domain resources, a time domain resource mapped by a downlink reference signal of one cell in the two adjacent cells may be adjusted, so that an uplink reference signal of one cell in the two adjacent cells and a downlink reference signal of the other cell are mapped to a same time domain resource as much as possible, so that interference between a reference signal and data of one cell in the two adjacent cells and those of the other cell in the two adjacent cells can be reduced or canceled as much as possible.

In a first optional implementation of the first aspect, the method for determining a time domain resource mapped by a reference signal provided in this application further includes: determining, by the user equipment based on an attribute of a time domain resource unit, a manner of mapping the reference signal to the time domain resource, where the manner includes: determining, by the user equipment based on the predefined first configuration information and/or the second configuration information sent by the base station, the time domain resource mapped by the reference signal.

In a second optional implementation of the first aspect, the method for determining, by the user equipment based on an attribute of a time domain resource unit, a manner of mapping the reference signal to the time domain resource includes: determining, by the user equipment based on predefined third configuration information and/or fourth configuration information sent by the base station, the manner of mapping the reference signal corresponding to the attribute of the time domain resource unit to the time domain resource.

In a third optional implementation of the first aspect, the attribute of the time domain resource unit includes at least a first attribute and a second attribute. The method for determining, by the user equipment based on an attribute of a time domain resource unit, a manner of mapping the reference signal to the time domain resource includes: determining, by the user equipment based on the first attribute, that the manner of mapping the reference signal to the time domain resource is: determining, by the user equipment based on the predefined first configuration information, the time domain resource mapped by the reference signal; or determining, by the user equipment based on the second attribute, that the manner of mapping the reference signal to the time domain resource is: determining, by the user equipment based on the second configuration information sent by the base station, the time domain resource mapped by the reference signal.

In this application, the user equipment can determine, based on the attribute of the time domain resource unit, the manner of mapping the reference signal to the time domain resource. Therefore, different manners of mapping the reference signal to the time domain resource may be determined for time domain resource units of different attributes, so that the manners of mapping the reference signal to the time domain resource may be determined for different time domain resource units in a more appropriate manner.

In a fourth optional implementation of the first aspect, the method for determining, by user equipment based on configuration information, a time domain resource mapped by a reference signal includes: determining, by the user equipment based on a time domain resource mapped by a predefined uplink reference signal, a time domain resource mapped by an uplink reference signal; and determining, by the user equipment based on the predefined first configuration information and/or the second configuration information sent by the base station, a time domain resource mapped by a downlink reference signal, where the predefined first configuration information and/or the second configuration information sent by the base station include/includes at least one of the following: a guard interval, a start time domain position of a control channel and/or a data channel in a time domain resource unit, and a quantity of symbols of a downlink control channel.

In this application, the user equipment can determine, by using at least one of the guard interval, the start time domain position of the control channel and/or the data channel in the time domain resource unit, and the quantity of symbols of the downlink control channel, the time domain resource mapped by the uplink reference signal and the time domain resource mapped by the downlink reference signal. Therefore, the time domain resource mapped by the reference signal may be determined in a plurality of manners in this application.

In a fifth optional implementation of the first aspect, the second configuration information sent by the base station includes: the time domain resource mapped by the reference signal. The method for determining, by user equipment based on configuration information, a time domain resource mapped by a reference signal includes: determining, by the user equipment based on the time domain resource mapped by the reference signal, the time domain resource mapped by the reference signal.

In this application, because the second configuration information includes the time domain resource mapped by the reference signal, in this embodiment of the present invention, the user equipment can directly obtain, based on the second configuration information sent by the base station, the time domain resource mapped by the reference signal.

In a sixth optional implementation of the first aspect, the second configuration information sent by the base station includes: a time domain resource, mapped by the reference signal, in at least one of a plurality of aggregate time domain resource units and/or a quantity of aggregate time domain resource units. The method for determining, by user equipment based on configuration information, a time domain resource mapped by a reference signal includes: determining, by the user equipment based on the time domain resource, mapped by the reference signal, in the at least one of the plurality of aggregate time domain resource units and/or the quantity of aggregate time domain resource units, the time domain resource, mapped by the reference signal, in the plurality of aggregate time domain resource units (which may be specifically a time domain resource, mapped by the reference signal, in each of the plurality of aggregate time domain resource units).

In this application, after receiving the second configuration information sent by the base station, the user equipment can determine the time domain resource, mapped by the reference signal, in each of the plurality of aggregate time domain resource units. In this way, time domain resources, mapped by reference signals, in the plurality of time domain resource units can be determined at a time, which is more convenient.

In a seventh optional implementation of the first aspect, the predefined first configuration information and/or the second configuration information sent by the base station include/includes: the subcarrier spacing of the reference signal. The method for determining, by user equipment based on configuration information, a subcarrier spacing of the reference signal includes: determining, by the user equipment, the subcarrier spacing of the reference signal based on the subcarrier spacing of the reference signal.

Because the predefined first configuration information and/or the second configuration information sent by the base station include/includes the subcarrier spacing of the reference signal, the user equipment can directly determine the subcarrier spacing based on the predefined first configuration information and/or the second configuration information sent by the base station.

According to a second aspect, a method for determining a time domain resource mapped by a reference signal is provided, and the method includes: determining, by a base station, a time domain resource mapped by a reference signal and/or a subcarrier spacing of the reference signal; and sending or receiving, by the base station, the reference signal based on the time domain resource mapped by the reference signal and/or the subcarrier spacing of the reference signal.

In a first optional implementation of the second aspect, the method for determining a time domain resource mapped by a reference signal provided in this application further includes: determining, by the base station based on an attribute of a time domain resource unit, a manner of mapping the reference signal to the time domain resource.

In a second optional implementation of the second aspect, the method for determining a time domain resource mapped by a reference signal provided in this application further includes: sending, by the base station, fourth configuration information to user equipment, where the fourth configuration information is used by the user equipment to determine the manner of mapping the reference signal corresponding to the attribute of the time domain resource unit to the time domain resource.

In a third optional implementation of the second aspect, the attribute of the time domain resource unit includes at least a first attribute. The method for determining, by the base station based on an attribute of a time domain resource unit, a manner of mapping the reference signal to the time domain resource includes: determining, by the base station based on the first attribute, that the manner of mapping the reference signal to the time domain resource is: determining, by the base station based on predefined first configuration information, the time domain resource mapped by the reference signal.

Further, the method for determining a time domain resource mapped by a reference signal provided in this application further includes: sending, by the base station, second configuration information to the user equipment, where the second configuration information is used by the user equipment to determine the time domain resource mapped by the reference signal and/or the subcarrier spacing of the reference signal.

For detailed descriptions about the technical effects of the second aspect or any optional implementation of the second aspect, refer to descriptions about the technical effects of the first aspect or any optional implementation of the first aspect. Details are not described herein again.

According to a third aspect, user equipment is provided, and the user equipment includes a determining module. The determining module is configured to determine, based on configuration information, a time domain resource mapped by a reference signal and/or a subcarrier spacing of the reference signal, where the configuration information includes predefined first configuration information and/or second configuration information sent by a base station.

In a first optional implementation of the third aspect, the determining module is further configured to determine, based on an attribute of a time domain resource unit, a manner of mapping the reference signal to the time domain resource, where the manner includes: determining, by the user equipment based on the predefined first configuration information and/or the second configuration information sent by the base station, the time domain resource mapped by the reference signal.

In a second optional implementation of the third aspect, the determining module is specifically configured to determine, based on predefined third configuration information and/or fourth configuration information sent by the base station, the manner of mapping the reference signal corresponding to the attribute of the time domain resource unit to the time domain resource.

In a third optional implementation of the third aspect, the attribute of the time domain resource unit includes at least a first attribute and a second attribute. The determining module is specifically configured to determine, based on the first attribute, that the manner of mapping the reference signal to the time domain resource is: determining, based on the predefined first configuration information, the time domain resource mapped by the reference signal; or determine, based on the second attribute, that the manner of mapping the reference signal to the time domain resource is: determining, based on the second configuration information sent by the base station, the time domain resource mapped by the reference signal.

In a fourth optional implementation of the third aspect, the determining module is specifically configured to: determine, based on a time domain resource mapped by a predefined uplink reference signal, a time domain resource mapped by an uplink reference signal; and determine, based on the predefined first configuration information and/or the second configuration information sent by the base station, a time domain resource mapped by a downlink reference signal, where the predefined first configuration information and/or the second configuration information sent by the base station include/includes at least one of the following: a guard interval, a start time domain position of a control channel and/or a data channel in the time domain resource unit, and a quantity of symbols of a downlink control channel.

In a fifth optional implementation of the third aspect, the second configuration information sent by the base station includes: the time domain resource mapped by the reference signal. The determining module is specifically configured to determine, based on the time domain resource mapped by the reference signal, the time domain resource mapped by the reference signal.

In a sixth optional implementation of the third aspect, the second configuration information sent by the base station includes: a time domain resource, mapped by the reference signal, in at least one of a plurality of aggregate time domain resource units and/or a quantity of aggregate time domain resource units. The determining module is specifically configured to determine, based on the time domain resource, mapped by the reference signal, in the at least one of the plurality of aggregate time domain resource units and/or the quantity of aggregate time domain resource units, the time domain resource, mapped by the reference signal, in the plurality of aggregate time domain resource units (which may be specifically a time domain resource, mapped by the reference signal, in each of the plurality of aggregate time domain resource units).

In a seventh optional implementation of the third aspect, the predefined first configuration information and/or the second configuration information sent by the base station include/includes: the subcarrier spacing of the reference signal. The determining module is specifically configured to determine the subcarrier spacing of the reference signal based on the subcarrier spacing of the reference signal.

For detailed descriptions about the technical effects of the third aspect or any optional implementation of the third aspect, refer to descriptions about the technical effects of the first aspect or any optional implementation of the first aspect. Details are not described herein again.

According to a fourth aspect, a base station is provided, and the base station includes a determining module and a transceiver module. The determining module is configured to determine a time domain resource mapped by a reference signal and/or a subcarrier spacing of the reference signal; and the transceiver module is configured to send or receive the reference signal based on the time domain resource mapped by the reference signal and/or the subcarrier spacing of the reference signal that are/is determined by the determining module.

In a first optional implementation of the fourth aspect, the determining module is further configured to determine, based on an attribute of a time domain resource unit, a manner of mapping the reference signal to the time domain resource.

In a second optional implementation of the fourth aspect, the transceiver module is further configured to send fourth configuration information to user equipment, where the fourth configuration information is used by the user equipment to determine the manner of mapping the reference signal corresponding to the attribute of the time domain resource unit to the time domain resource.

In a third optional implementation of the fourth aspect, the attribute of the time domain resource unit includes at least a first attribute. The determining module is specifically configured to determine, based on the first attribute, that the manner of mapping the reference signal to the time domain resource is: determining, based on predefined first configuration information, the time domain resource mapped by the reference signal.

Further, in the base station provided in this application, the transceiver module is further configured to send second configuration information to the user equipment, where the second configuration information is used by the user equipment to determine the time domain resource mapped by the reference signal and/or the subcarrier spacing of the reference signal.

For detailed descriptions about the technical effects of the fourth aspect or any optional implementation of the fourth aspect, refer to descriptions about the technical effects of the second aspect or any optional implementation of the second aspect. Details are not described herein again.

Optionally, in the first to the fourth aspects, the attribute of the time domain resource unit includes at least one of the following: an index of the time domain resource unit, a set number of the time domain resource unit, and a type of the time domain resource unit.

Optionally, an index of an uplink time domain resource unit may be a sequence number of the index of the uplink time domain resource unit, a set number of the uplink time domain resource unit may be a sequence number of the set number of the uplink time domain resource unit, and a type of the uplink time domain resource unit may be a sequence number of the type of the uplink time domain resource unit.

Optionally, in the first to the fourth aspects, the configuration information may include at least one of the following: the guard interval, the start time domain position of the control channel and/or the data channel in the time domain resource unit, the quantity of symbols of the downlink control channel, the time domain resource mapped by the reference signal, the subcarrier spacing of the reference signal, the quantity of aggregate time domain resource units, and the time domain resource, mapped by the reference signal, in the at least one of the plurality of aggregate time domain resource units.

The configuration information may be the predefined first configuration information and/or the second configuration information sent by the base station to the user equipment.

It can be understood that, the predefined first configuration information may include at least one of the following: the guard interval, the start time domain position of the control channel and/or the data channel in the time domain resource unit, the quantity of symbols of the downlink control channel, the time domain resource mapped by the reference signal, the subcarrier spacing of the reference signal, the quantity of aggregate time domain resource units, and the time domain resource, mapped by the reference signal, in the at least one of the plurality of aggregate time domain resource units.

The second configuration information sent by the base station to the user equipment may include at least one of the following: the guard interval, the start time domain position of the control channel and/or the data channel in the time domain resource unit, the quantity of symbols of the downlink control channel, the time domain resource mapped by the reference signal, the subcarrier spacing of the reference signal, the quantity of aggregate time domain resource units, and the time domain resource, mapped by the reference signal, in the at least one of the plurality of aggregate time domain resource units.

Optionally, in the first to the fourth aspects, the second configuration information sent by the base station to the user equipment may include at least one of the following: the guard interval, the start time domain position of the control channel and/or the data channel in the time domain resource unit, and the quantity of symbols of the downlink control channel. The second configuration information is used by the user equipment to determine the time domain resource mapped by the reference signal.

Optionally, in the first to the fourth aspects, the second configuration information sent by the base station to the user equipment may include: the time domain resource mapped by the reference signal. The second configuration information is used by the user equipment to determine the time domain resource mapped by the reference signal.

Optionally, in the first to the fourth aspects, the second configuration information sent by the base station to the user equipment may include: the time domain resource, mapped by the reference signal, in the at least one of the plurality of aggregate time domain resource units and/or the quantity of aggregate time domain resource units. The second configuration information is used by the user equipment to determine the time domain resource mapped by the reference signal.

Optionally, in the first to the fourth aspects, the second configuration information sent by the base station to the user equipment may include: the subcarrier spacing of the reference signal. The second configuration information is used by the user equipment to determine the subcarrier spacing of the reference signal.

Optionally, in this application, the guard interval may be a sequence number of the guard interval; the start time domain position of the control channel and/or the data channel in the time domain resource unit may be a sequence number of the start time domain position of the control channel and/or the data channel in the time domain resource unit; the quantity of symbols of the downlink control channel may be a sequence number of the quantity of symbols of the downlink control channel; the time domain resource mapped by the reference signal may be a sequence number of the time domain resource mapped by the reference signal; the subcarrier spacing of the reference signal may be a sequence number of the subcarrier spacing of the reference signal; the quantity of aggregate time domain resource units may be a sequence number of the quantity of aggregate time domain resource units; and the time domain resource, mapped by the reference signal, in the at least one of the plurality of aggregate time domain resource units may be a sequence number of the time domain resource, mapped by the reference signal, in the at least one of the plurality of aggregate time domain resource units.

Optionally, in the first to the fourth aspects, the second configuration information sent by the base station to the user equipment is sent by the base station to the user equipment by using at least one of broadcast information, higher layer signaling, and control channel information.

In this application, the base station can send the second configuration information to the user equipment in at least one of the foregoing manners. Therefore, the base station can send the second configuration information to the user equipment more flexibly in this application.

Optionally, in the first to the fourth aspects, the predefined third configuration information may include: a correspondence between an attribute of a downlink time domain resource unit and a manner of mapping the downlink reference signal to the time domain resource.

Optionally, in the first to the fourth aspects, the fourth configuration information sent by the base station to the user equipment may include: the correspondence between the attribute of the downlink time domain resource unit and the manner of mapping the downlink reference signal to the time domain resource.

According to a fifth aspect, user equipment is provided, and the user equipment includes a processor, a transceiver, and a memory. The memory is configured to store a computer executable instruction, and when the user equipment runs, the processor executes the computer executable instruction stored by the memory, so that the user equipment performs the method for determining a time domain resource mapped by a reference signal according to the first aspect or any optional implementation of the first aspect.

According to a sixth aspect, a computer readable storage medium is provided, and the computer readable storage medium stores one or more programs, where the one or more programs include a computer executable instruction. When a processor of user equipment executes the computer executable instruction, the user equipment performs the method for determining a time domain resource mapped by a reference signal according to the first aspect or any optional implementation of the first aspect.

For detailed descriptions about the technical effects of the fifth aspect and sixth aspect, refer to descriptions about the technical effects of the first aspect or any optional implementation of the first aspect. Details are not described herein again.

According to a seventh aspect, a base station is provided, and the base station includes a processor, a transceiver, and a memory. The memory is configured to store a computer executable instruction, and when the base station runs, the processor executes the computer executable instruction stored by the memory, so that the base station performs the method for determining a time domain resource mapped by a reference signal according to the second aspect or any optional implementation of the second aspect.

According to an eighth aspect, a computer readable storage medium is provided, and the computer readable storage medium stores one or more programs, where the one or more programs include a computer executable instruction. When a processor of a base station executes the computer executable instruction, the base station performs the method for determining a time domain resource mapped by a reference signal according to the second aspect or any optional implementation of the second aspect.

For detailed descriptions about the technical effects of the seventh aspect and the eighth aspect, refer to descriptions about the technical effects of the second aspect or any optional implementation of the second aspect. Details are not described herein again.

According to a ninth aspect, a wireless communications system is provided, and the wireless communications system includes: the user equipment according to the third aspect or any optional implementation of the third aspect, and the base station according to the fourth aspect or any optional implementation of the fourth aspect. Alternatively, the wireless communications system includes: the user equipment according to the fifth aspect and the base station according to the seventh aspect.

For detailed descriptions about the technical effects of the ninth aspect, refer to descriptions about the technical effects of the third aspect or any optional implementation of the third aspect, the fifth aspect, the fourth aspect or any optional implementation of the fourth aspect, and the seventh aspect. Details are not described herein again.

DESCRIPTION OF EMBODIMENTS

In the embodiments of the present invention, the terms "first", "second", and the like are intended to distinguish between different objects but not to describe a specific order. For example, first configuration information and second configuration information are intended to distinguish between different configuration information, but not to describe a specific order of different configuration information.

In the embodiments of the present invention, the word "exemplary", "for example", or the like is used to represent giving an example, an illustration, or a description. Any embodiment or design scheme described as "exemplary" or "for example" in the embodiments of the present invention should not be explained as being more preferred or having more advantages than another embodiment or design scheme. To be specific, use of the word "exemplary" or "for example" or the like is intended to present a related concept in a specific manner.

The term "and/or" in this specification describes only an association relationship for describing associated objects and represents that three relationships may exist. For example, A and/or B may represent the following three cases: Only A exists, both A and B exist, and only B exists. "/" in this specification represents an "or" relationship between associated objects. For example, A/B may represent A or B.

The following describes the technical solutions in the embodiments of the present invention in detail with reference to the accompanying drawings in the embodiments of the present invention.

Figure 1:
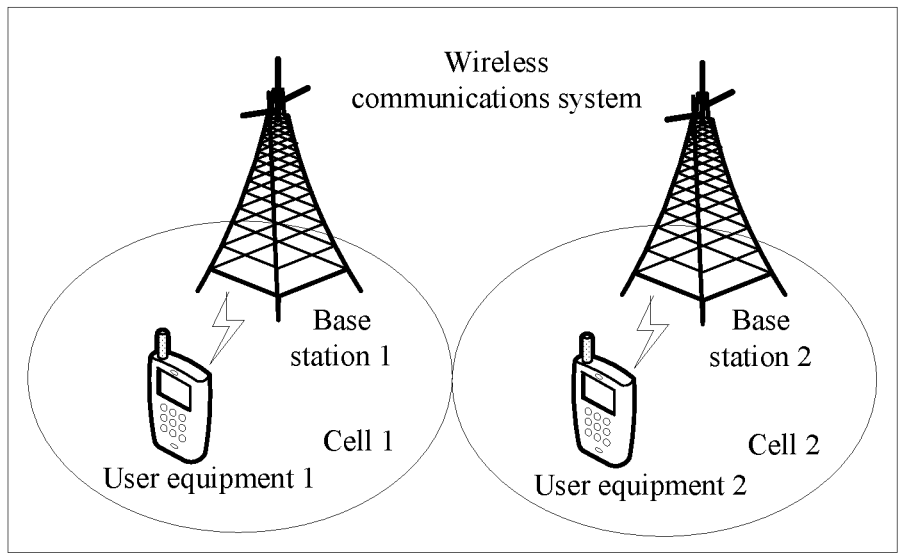
FIG. 1 is a schematic architectural diagram of a wireless communications system according to an embodiment of the present invention.

A method for determining a time domain resource mapped by a reference signal provided in the embodiments of the present invention can be applied to a wireless communications system. For example, FIG. 1 is a schematic architectural diagram of a wireless communications system according to an embodiment of the present invention. In FIG. 1, the wireless communications system includes two adjacent cells: a cell 1 and a cell 2, where the cell 1 includes a base station 1 and user equipment 1, and the cell 2 includes a base station 2 and user equipment 2. In the wireless communications system, the base station 1 and the user equipment 1 in the cell 1 can perform uplink and downlink communication. To be specific, the user equipment 1 can send uplink information (including uplink data, an uplink reference signal, and the like) to the base station 1, and the base station 1 can send downlink information (including downlink data, a downlink reference signal, and the like) to the user equipment 1. The base station 2 and the user equipment 2 in the cell 2 can perform uplink and downlink communication. To be specific, the user equipment 2 can send uplink information (including uplink data, an uplink reference signal, and the like) to the base station 2, and the base station 2 can send downlink information (including downlink data, a downlink reference signal, and the like) to the user equipment 2. In actual application, when directions of information transmission in the cell 1 and the cell 2 are different, if the user equipment 1 in the cell 1 sends the uplink information to the base station 1, the base station 2 in the cell 2 may receive the uplink information sent by the user equipment 1, and if the base station 2 in the cell 2 sends the downlink information to the user equipment 2, the user equipment 1 in the cell 1 may receive the downlink information sent by the base station 2. Therefore, if a time domain resource of a reference signal is fixed, the two adjacent cells may transmit reference signals by using different time domain resources. Consequently, interference occurs between a reference signal and data that are transmitted by one cell in the two adjacent cells and those transmitted by the other cell in the two adjacent cells, causing an error in reference signal demodulation, an inaccurate channel estimation result, and an error in data demodulation.

To resolve the foregoing problem, an embodiment of the present invention provides a method for determining a time domain resource mapped by a reference signal. When user equipments and base stations in the two adjacent cells all determine, according to the method for determining a time domain resource mapped by a reference signal provided in this embodiment of the present invention, a time domain resource mapped by an uplink reference signal and a time domain resource mapped by a downlink reference signal, the uplink reference signal and the downlink reference signal in the two adjacent cells can be mapped to a same time domain resource. To be specific, interference does not occur between data and a reference signal of one cell in the two adjacent cells and those of the other cell in the two adjacent cells. In this way, it can be ensured that the base stations and the user equipments of the two adjacent cells all correctly demodulate the reference signals. In addition, a relatively accurate result is obtained after estimation is performed on a channel based on the reference signal, so that data can be correctly demodulated.

For example, when the method for determining a time domain resource mapped by a reference signal provided in this embodiment of the present invention is used in determining the time domain resource mapped by the uplink reference signal, in the wireless communications system shown in FIG. 1, the user equipment can determine, based on configuration information, the time domain resource mapped by the uplink reference signal, and send, on the time domain resource, the uplink reference signal to the base station; and then the base station determines the time domain resource mapped by the uplink reference signal, and the base station receives, on the time domain resource, the uplink reference signal sent by the user equipment.

For example, when the method for determining a time domain resource mapped by a reference signal provided in this embodiment of the present invention is used in determining the time domain resource mapped by the downlink reference signal, in the wireless communications system shown in FIG. 1, the base station can determine the time domain resource mapped by the downlink reference signal, and send, on the time domain resource, the downlink reference signal to the user equipment; and then the user equipment determines the time domain resource mapped by the downlink reference signal, and the user equipment receives, on the time domain resource, the downlink reference signal sent by the base station.

Figure 2:
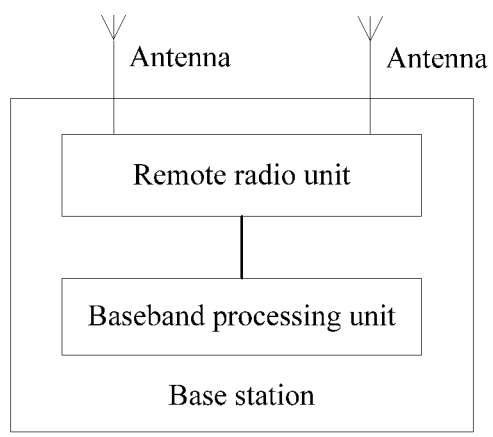
FIG. 2 is a schematic hardware diagram of a base station according to an embodiment of the present invention.

For example, the following describes integral components of the base station shown in FIG. 1 in this embodiment of the present invention in detail with reference to FIG. 2. As shown in FIG. 2, the base station may include: a remote radio unit (radio remote unit, RRU), a baseband processing unit (building base band unit, BBU), and an antenna. The RRU and the BBU may be connected through a fiber, and the RRU is connected to the antenna through a coaxial cable and a power divider (or a coupler). Usually, one BBU may be connected to a plurality of RRUs.

The RRU may include four modules: a digital intermediate frequency module, a transceiver module, a power amplification module, and a filtering module. The digital intermediate frequency module is configured to perform modulation and demodulation, digital up- and down-frequency conversion, digital-to-analog conversion, and the like for optical transmission. The transceiver module implements conversion from an intermediate frequency signal into a radio frequency signal, and transmits, through the antenna, the radio frequency signal obtained after amplification by the power amplification module and filtering by the filtering module.

The BBU is configured to implement a baseband processing function (for example, coding, multiplexing, modulation, and spread) of a Uu interface (namely, an interface between the user equipment and the base station), an interface function of a logical interface between a radio network controller (radio network controller, RNC) and the base station, signaling processing, a local and remote operation and maintenance function, an operating status monitoring function of and an alarm information reporting function of a base station system, and the like.

The user equipment in this embodiment of the present invention may be: a mobile station (mobile station, MS), a mobile terminal (mobile terminal), a notebook computer, or the like, and the user equipment may communicate with one or more core networks through a radio access network (radio access network, RAN). For example, the user equipment may be a mobile phone or a computer that has a mobile terminal. For example, the user equipment may be a portable, pocket-sized, handheld, computer-built-in, or in-vehicle mobile apparatus, which exchanges voices and/or data with the radio access network.

Figure 3:
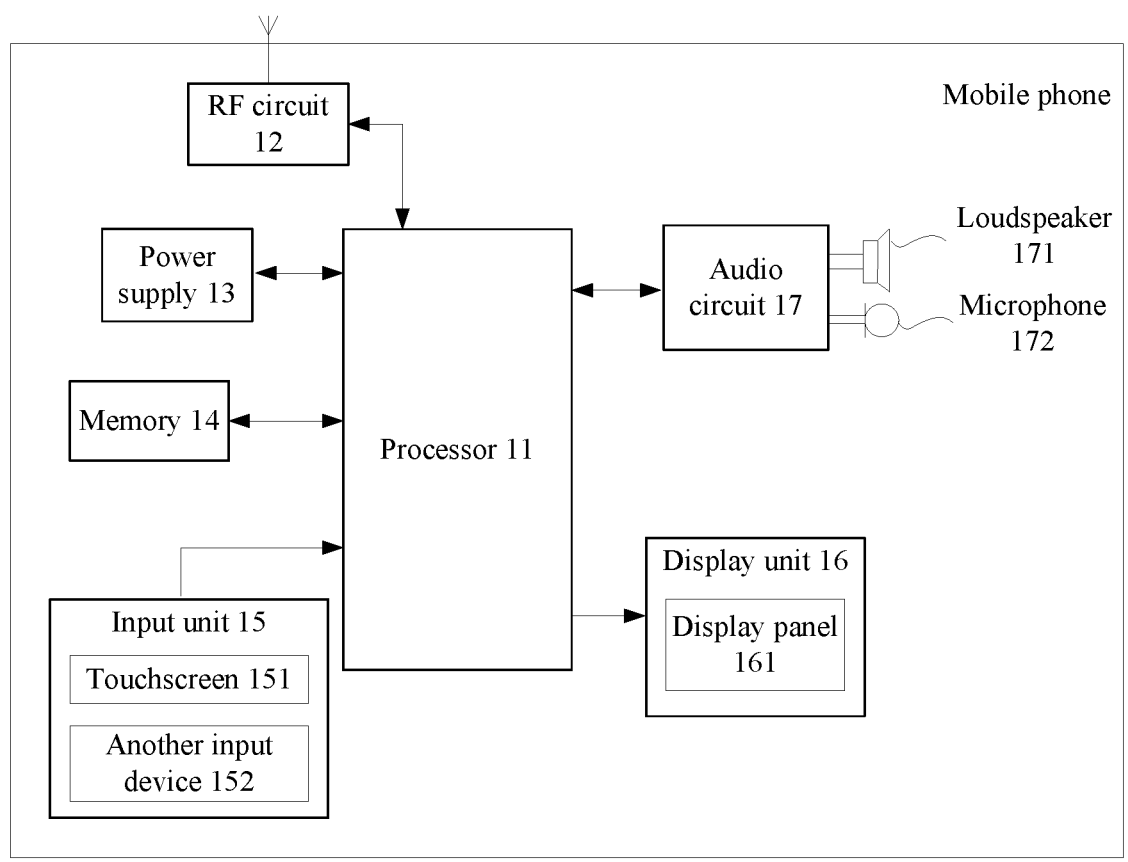
FIG. 3 is a schematic hardware diagram of a mobile phone according to an embodiment of the present invention.

For example, in this embodiment of the present invention, the user equipment shown in FIG. 1 may be a mobile phone. The following describes integral components of the mobile phone in this embodiment of the present invention in detail with reference to FIG. 3. As shown in FIG. 3, the mobile phone may include: components such as a processor 11, a radio frequency (radio frequency, RF) circuit 12, power supply 13, a memory 14, an input unit 15, a display unit 16, and an audio circuit 17. A person skilled in the art may understand that a structure of the mobile phone shown in FIG. 3 does not constitute a limitation on the mobile phone, and the mobile phone may include more or fewer components than those shown in FIG. 3. Alternatively, some of the components shown in FIG. 3 may be combined, or the mobile phone may have components that are arranged differently from those shown in FIG. 3.

The processor 11 is a control center of the mobile phone, and connected to parts of the entire mobile phone through various interfaces and lines, and performs various functions and data processing of the mobile phone by running or executing a software program and/or a module stored in the memory 14 and by invoking data stored in the memory 14, to perform overall monitoring on the mobile phone. Optionally, the processor 11 may include one or more processing units. Optionally, an application processor and a modem processor may be integrated into the processor 11, where the application processor mainly processes an operating system, a user interface, an application program, and the like, and the modem processor mainly processes wireless communication. It can be understood that, alternatively the modem processor may not be integrated into the processor 11.

The RF circuit 12 may be configured to: receive or send a signal in an information receiving/sending process or a call process, and in particular, after receiving the downlink information from the base station, send the downlink information to the processor 11 for processing; and in addition, send the uplink data to the base station. Usually, the RF circuit includes but is not limited to an antenna, at least one amplifier, a transceiver, a coupler, a low noise amplifier (Low Noise Amplifier, LNA), a duplexer, and the like. In addition, the RF circuit 12 may further communicate with a network and another device through wireless communication. The wireless communication may use any communications standard or protocol, including but not limited to a Global System for Mobile communications (global system of mobile communication, GSM), a general packet radio service (general packet radio service, GPRS), Code-Division Multiple Access (code division multiple access, CDMA), Wideband Code Division Multiple Access (wideband code division multiple access, WCDMA), Long Term Evolution (long term evolution, LTE), an email, a short message service (short messaging service, SMS), and the like.

The power supply 13 may be a battery. Optionally, the power supply 13 may be logically connected to the processor 11 through a power management system, to implement functions such as charging management, discharging management, and power consumption management through the power management system.

The memory 14 may be configured to store the software program and the module, and the processor 11 runs the software program and the module stored in the memory 14, to perform various functional applications and data processing of the mobile phone. The memory 14 may mainly include a program storage area and a data storage area, where the program storage area may store an operating system, an application program required by at least one function (such as a sound play function or an image play function), and the like; and the data storage area may store data (such as audio data, image data, or a phone book) that is created based on use of the mobile phone, and the like. In addition, the memory 14 may include a high-speed random access memory, and may further include a non-volatile memory such as at least one magnetic disk storage device, a flash memory device, or another volatile solid-state storage device.

The input unit 15 may be configured to receive entered numerical or character information, and generate key signal inputs that are related to user settings and function control of the mobile phone. Specifically, the input unit 15 may include a touchscreen 151 and another input device 152. The touchscreen 151 is also referred to as a touch panel and may collect a touch operation (such as an operation performed by a user on or near the touchscreen 151 by using any proper object or accessory such as a finger and a stylus) on or near the touchscreen 151, and drive a corresponding connection apparatus based on a preset program. Optionally, the touchscreen 151 may include two parts: a touch detection apparatus and a touch controller. The touch detection apparatus detects a touch orientation of the user, detects a signal arising from the touch operation, and sends the signal to the touch controller. The touch controller receives touch information from the touch detection apparatus, converts the touch information into touch coordinates, and sends the touch coordinates to the processor 11. In addition, the touch controller can receive a command sent by the processor 11 and execute the command. In addition, the touchscreen 151 may be implemented in a plurality of types such as a resistive type, a capacitive type, an infrared type, and a surface acoustic wave type. The another input device 152 may include but is not limited to one or more of a physical keyboard, a function key (such as a volume control key or an on/off key), a trackball, a mouse, a joystick, and the like.

The display unit 16 may be configured to display information entered by the user or information provided for the user, and various menus of the mobile phone. The display unit 16 may include a display panel 161. Optionally, the display panel 161 may be configured in a form such as a liquid crystal display (liquid crystal display, LCD) or an organic light-emitting diode (organic light-emitting diode, OLED). Further, the touchscreen 151 may cover the display panel 161. When detecting a touch operation on or near the touchscreen 151, the touchscreen 151 transmits the touch operation to the processor 11 to determine a type of a touch event, and then the processor 11 provides a corresponding visual output on the display panel 161 based on the type of the touch event. Although in FIG. 3, the touchscreen 151 and the display panel 161 are used as two independent parts to implement input and output functions of the mobile phone, in some embodiments, the touchscreen 151 and the display panel 161 may be integrated to implement the input and output functions of the mobile phone.

An audio circuit 17, a speaker 171, and a microphone 172 are configured to provide an audio interface between the user and the mobile phone. The audio circuit 17 may transmit, to the speaker 171, an electrical signal that is converted from received audio data, and the speaker 171 converts the electrical signal into a sound signal and outputs the sound signal. In addition, the microphone 172 converts a collected sound signal into an electrical signal, and the audio circuit 17 receives the electrical signal and converts the electrical signal into audio data; and then outputs the audio data to the RF circuit 12, to send the audio data to, for example, another mobile phone, or outputs the audio data to the memory 14 for further processing.

Optionally, the foregoing mobile phone may further include various sensors, for example, a gyro sensor, a hygrometer sensor, an infrared sensor, and a magnetometer sensor. Details are not described herein.

Optionally, the foregoing mobile phone may further include a Wireless Fidelity (wireless fidelity, WiFi) module, a Bluetooth module, and the like, and details are not described herein.

The following describes a method for determining a time domain resource mapped by a reference signal provided in an embodiment of the present invention as an example.

The method for determining a time domain resource mapped by a reference signal provided in this embodiment of the present invention can be applied to a case of determining a time domain resource mapped by an uplink reference signal, or may be applied to a case of determining a time domain resource mapped by a downlink reference signal. Therefore, the following separately describes these two cases as an example.

Case 1: Determine a Time Domain Resource Mapped by an Uplink Reference Signal

Figure 4:
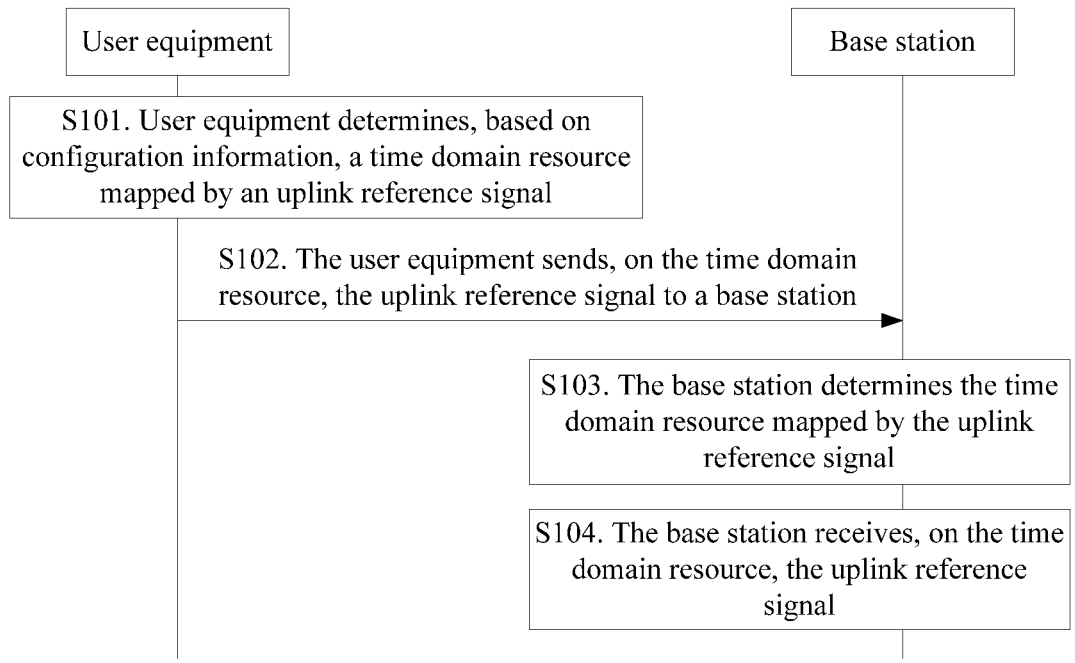
FIG. 4 is a schematic diagram 1 of a method for determining a time domain resource mapped by a reference signal according to an embodiment of the present invention.

As shown in FIG. 4, an embodiment of the present invention provides a method for determining a time domain resource mapped by a reference signal, and the method is a method for determining a time domain resource mapped by an uplink reference signal. In other words, the method is used to determine a time domain resource mapped by an uplink reference signal, and may include the following S101 to S104.

S101. User equipment determines, based on configuration information, a time domain resource mapped by an uplink reference signal.

The configuration information may include predefined first configuration information and/or second configuration information sent by a base station. To be specific, the configuration information may be one of the following three types of information:

(1) the predefined first configuration information;

(2) the second configuration information sent by the base station; and (3) the predefined first configuration information and the second configuration information sent by the base station.

Optionally, in this embodiment of the present invention, the configuration information (namely, the predefined first configuration information, the second configuration information sent by the base station, or the predefined first configuration information and the second configuration information sent by the base station) may specifically include at least one of the following: a guard interval, a start time domain position of a control channel and/or a data channel in a time domain resource unit, a quantity of symbols of a downlink control channel, the time domain resource mapped by the reference signal, a subcarrier spacing of the reference signal, a quantity of aggregate time domain resource units, and a time domain resource, mapped by the reference signal, in at least one of a plurality of aggregate time domain resource units.

Optionally, in this embodiment of the present invention, the guard interval may be a sequence number of the guard interval; the start time domain position of the control channel and/or the data channel in the time domain resource unit may be a sequence number of the start time domain position of the control channel and/or the data channel in the time domain resource unit; the quantity of symbols of the downlink control channel may be a sequence number of the quantity of symbols of the downlink control channel; the time domain resource mapped by the reference signal may be a sequence number of the time domain resource mapped by the reference signal; the subcarrier spacing of the reference signal may be a sequence number of the subcarrier spacing of the reference signal; the quantity of aggregate time domain resource units may be a sequence number of the quantity of aggregate time domain resource units; and the time domain resource, mapped by the reference signal, in the at least one of the plurality of aggregate time domain resource units may be a sequence number of the time domain resource, mapped by the reference signal, in the at least one of the plurality of aggregate time domain resource units.

Optionally, when the user equipment determines, based on the configuration information, the time domain resource mapped by the uplink reference signal, reference signals related to the configuration information may all be uplink reference signals, and time domain resource units related to the configuration information may all be uplink time domain resource units.

Optionally, in this embodiment of the present invention, the time domain resource mapped by the uplink reference signal may include at least one of the following: a time domain symbol index mapped by the uplink reference signal, an offset of the uplink reference signal relative to the start time domain position of the data channel, and an offset of the uplink reference signal relative to the start time domain position of the control channel.

In this embodiment of the present invention, the time domain resource mapped by the uplink reference signal is a position of a symbol, mapped by the uplink reference signal, in the uplink time domain resource unit.

Optionally, in this embodiment of the present invention, the time domain symbol index mapped by the uplink reference signal may correspond to the position of the symbol, mapped by the uplink reference signal, in the uplink time domain resource unit. For example, when the time domain symbol index mapped by the uplink reference signal is 1, the position of the symbol, mapped by the uplink reference signal, in the uplink time domain resource unit may be the third symbol in the uplink time domain resource unit; when the time domain symbol index mapped by the uplink reference signal is 2, the position of the symbol, mapped by the uplink reference signal, in the uplink time domain resource unit may be the fourth symbol in the uplink time domain resource unit. Specifically, a correspondence between the time domain symbol index mapped by the uplink reference signal and the position of the symbol, mapped by the uplink reference signal, in the uplink time domain resource unit may be set according to an actual use requirement, and is not limited in this embodiment of the present invention.

Optionally, in this embodiment of the present invention, the offset of the uplink reference signal relative to the start time domain position of the data channel may be a position of a symbol, mapped by the uplink reference signal, in an uplink data part of the uplink time domain resource unit. For example, when the offset of the uplink reference signal relative to the start time domain position of the data channel is 1, the position of the symbol, mapped by the uplink reference signal, in the uplink data part of the uplink time domain resource unit may be the first symbol of the uplink data part of the uplink time domain resource unit. Specifically, the offset of the uplink reference signal relative to the start time domain position of the data channel may be set according to an actual use requirement, and is not limited in this embodiment of the present invention.

Optionally, in this embodiment of the present invention, the offset of the uplink reference signal relative to the start time domain position of the control channel may be the position of the symbol, mapped by the uplink reference signal, in the uplink time domain resource unit. For example, when the offset of the uplink reference signal relative to the start time domain position of the control channel is 3, the position of the symbol, mapped by the uplink reference signal, in the uplink time domain resource unit may be the third symbol in the uplink time domain resource unit. Specifically, the offset of the uplink reference signal relative to the start time domain position of the data channel may be set according to an actual use requirement, and is not limited in this embodiment of the present invention.

Figure 5:
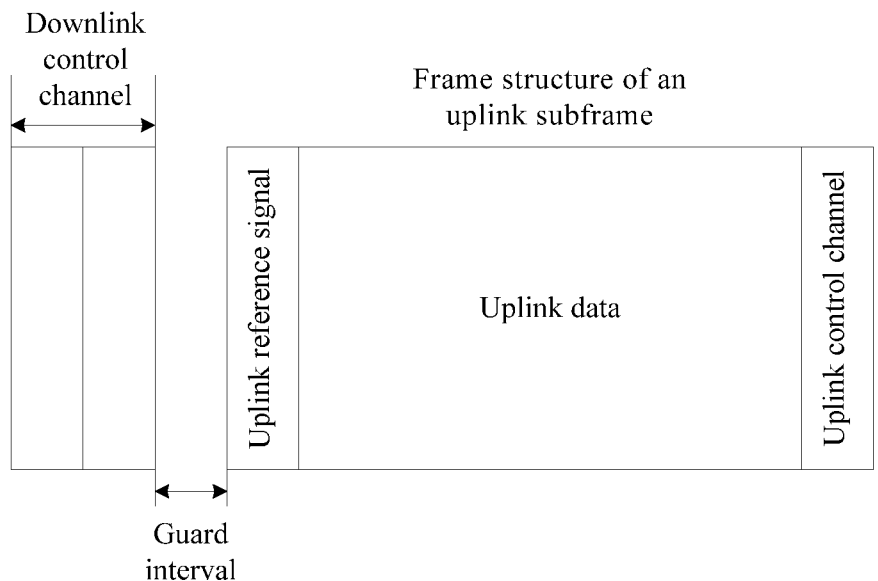
FIG. 5 is a schematic diagram of a frame structure of an uplink subframe according to an embodiment of the present invention.

It should be noted that, in this embodiment of the present invention, the uplink time domain resource unit may be an uplink subframe, an uplink slot (slot), or an uplink mini-slot (mini-slot). Alternatively, the uplink time domain resource unit may be an uplink time domain resource unit in another form, and no limitation is imposed in this embodiment of the present invention. That the uplink time domain resource unit is an uplink subframe is used as an example. FIG. 5 is a schematic diagram of a frame structure of an uplink subframe. The uplink subframe includes a downlink control channel, a guard interval, an uplink reference signal, uplink data, and an uplink control channel.

Optionally, in this embodiment of the present invention, the user equipment may determine, based on an attribute of the uplink time domain resource unit, a manner of mapping the uplink reference signal to the time domain resource. That the user equipment determines the manner of mapping the uplink reference signal to the time domain resource may include: determining, by the user equipment based on the predefined first configuration information and/or the second configuration information sent by the base station, the time domain resource mapped by the uplink reference signal.

The attribute of the uplink time domain resource unit may include at least one of the following: an index of the uplink time domain resource unit, a set number of the uplink time domain resource unit, and a type of the uplink time domain resource unit. For example, the index of the uplink time domain resource unit may be a number of the uplink time domain resource unit; the type of the uplink time domain resource unit may be a static type or a dynamic type; and the set number of the uplink time domain resource unit can be used to indicate the type of the uplink time domain resource unit. For example, when the set number of the uplink time domain resource unit is 1, it can indicate that the type of the uplink time domain resource unit is the static type; when the set number of the uplink time domain resource unit is 2, it can indicate that the type of the uplink time domain resource unit is the dynamic type. Specifically, the attribute of the uplink time domain resource unit may be set according to an actual use requirement, and is not limited in this embodiment of the present invention.

Optionally, in this embodiment of the present invention, the index of the uplink time domain resource unit may be a sequence number of the index of the uplink time domain resource unit; the set number of the uplink time domain resource unit may be a sequence number of the set number of the uplink time domain resource unit; and the type of the uplink time domain resource unit may be a sequence number of the type of the uplink time domain resource unit.

Optionally, in this embodiment of the present invention, the method for determining, by the user equipment based on an attribute of the uplink time domain resource unit, a manner of mapping the uplink reference signal to the time domain resource may include: determining, by the user equipment based on predefined third configuration information and/or fourth configuration information sent by the base station, a manner of mapping a reference signal corresponding to the attribute of the time domain resource unit to the time domain resource. The predefined third configuration information and/or the fourth configuration information sent by the base station may include: a correspondence between the attribute of the uplink time domain resource unit and the manner of mapping the uplink reference signal to the time domain resource.

It should be noted that, in this embodiment of the present invention, the predefined third configuration information and/or the fourth configuration information sent by the base station may be used by the user equipment to determine the manner of mapping the uplink reference signal corresponding to the attribute of the uplink time domain resource unit to the time domain resource.

Optionally, in this embodiment of the present invention, the attribute of the uplink time domain resource unit may include at least a first attribute and a second attribute.

The method for determining, by the user equipment based on an attribute of the uplink time domain resource unit, a manner of mapping the uplink reference signal to the time domain resource may be specifically one of the following:

(a) the user equipment determines, based on the first attribute, that the manner of mapping the reference signal to the time domain resource is: determining, by the user equipment based on the predefined first configuration information, the time domain resource mapped by the uplink reference signal; and (b) the user equipment determines, based on the second attribute, that the manner of mapping the reference signal to the time domain resource is: determining, by the user equipment based on the second configuration information sent by the base station, the time domain resource mapped by the uplink reference signal.

Optionally, in this embodiment of the present invention, the first attribute may indicate that the attribute of the uplink time domain resource unit is the static type, and the second attribute may indicate that the attribute of the uplink time domain resource unit is the dynamic type. For example, when the attribute of the uplink time domain resource unit is the static type, the user equipment may determine, based on the predefined first configuration information, the time domain resource mapped by the uplink reference signal. When the attribute of the uplink time domain resource unit is the dynamic type, the user equipment may determine, based on the second configuration information sent by the base station, the time domain resource mapped by the uplink reference signal.

That the attribute of the time domain resource unit is the static type may be understood as follows: The time domain resource unit is fixedly set as the uplink time domain resource unit at any time; or quantities of symbols of downlink control channels of time domain resource units (including the uplink time domain resource unit and/or the downlink time domain resource unit) of two adjacent cells are the same; or quantities of symbols of downlink control channels of time domain resource units (including the uplink time domain resource unit and/or the downlink time domain resource unit) of two adjacent cells change synchronously. That the attribute of the time domain resource unit is the dynamic type may be understood as follows: The time domain resource unit may be the uplink time domain resource unit or may be the downlink time domain resource unit; or quantities of symbols of downlink control channels of time domain resource units (including the uplink time domain resource unit and/or the downlink time domain resource unit) of two adjacent cells are different; or quantities of symbols of downlink control channels of time domain resource units (including the uplink time domain resource unit and/or the downlink time domain resource unit) of two adjacent cells do not change synchronously.

For example, the following describes in different scenarios (scenario 1, scenario 2, and scenario 3), the method for determining, by user equipment based on configuration information, a time domain resource mapped by an uplink reference signal in this embodiment of the present invention.

Scenario 1: The quantities of symbols of the downlink control channels of the time domain resource units (including the uplink time domain resource unit and the downlink time domain resource unit, for example, an uplink time domain resource unit of one cell in the two adjacent cells and a downlink time domain resource unit of the other cell) of the two adjacent cells are the same; or the quantities of symbols of the downlink control channels of the time domain resource units of the two adjacent cells change synchronously.

Optionally, in scenario 1, for the uplink reference signal, the user equipment may determine, based on a time domain resource mapped by a predefined uplink reference signal, the time domain resource mapped by the uplink reference signal. In other words, the user equipment may directly learn, based on the predefined first configuration information (the predefined first configuration information includes the time domain resource mapped by the predefined uplink reference signal), the time domain resource mapped by the uplink reference signal.

For example, it is assumed that the time domain resource mapped by the uplink reference signal is the offset i of the uplink reference signal relative to the start time domain position of the data channel, and i is an integer greater than or equal to 1. When i=1, the time domain resource mapped by the uplink reference signal is the first symbol in the uplink data part of the uplink time domain resource unit.

For example, it is assumed that the time domain resource mapped by the uplink reference signal is the offset i of the uplink reference signal relative to the start time domain position of the control channel, and i is an integer greater than or equal to 3. When i=3, the time domain resource mapped by the uplink reference signal is the third symbol in the uplink time domain resource unit.

In scenario 1, for the downlink reference signal, a process of determining, by the user equipment, the time domain resource mapped by the downlink reference signal is described in detail in the following case 2 (of determining the time domain resource mapped by the downlink reference signal). Details are not described herein.

Scenario 2: The quantities of symbols of the downlink control channels of the time domain resource units (including the uplink time domain resource unit and the downlink time domain resource unit, for example, an uplink time domain resource unit of one cell in the two adjacent cells and a downlink time domain resource unit of the other cell) of the two adjacent cells do not change synchronously.

Optionally, in scenario 2, for the uplink reference signal, the second configuration information sent by the base station may include the time domain resource mapped by the uplink reference signal. In this case, the foregoing S101 in FIG. 4 may be replaced with the following S101a.

In scenario 2, for the downlink reference signal, a process of determining, by the user equipment, the time domain resource mapped by the downlink reference signal is described in detail in the following case 2 (of determining the time domain resource mapped by the downlink reference signal). Details are not described herein.

S101a. The user equipment determines, based on the time domain resource mapped by the uplink reference signal, the time domain resource mapped by the uplink reference signal.

Scenario 3: On the basis of scenario 1 or scenario 2, a time domain resource unit of at least one cell in the two adjacent cells (for example, an uplink time domain resource unit of one cell in the two adjacent cells and a downlink time domain resource unit of the other cell) is formed through aggregation of a plurality of uplink time domain resource units (referred to as aggregate uplink time domain resource units below).

Optionally, in scenario 3, for the uplink reference signal, the second configuration information sent by the base station may include: a time domain resource, mapped by the uplink reference signal, in at least one of a plurality of aggregate uplink time domain resource units and/or a quantity of aggregate uplink time domain resource units. In this case, the foregoing S101 in FIG. 4 may be replaced with the following S101b.

S101b. The user equipment determines, based on a time domain resource, mapped by an uplink reference signal, in at least one of a plurality of aggregate uplink time domain resource units and/or a quantity of aggregate uplink time domain resource units, the time domain resource, mapped by the uplink reference signal, in the plurality of aggregate uplink time domain resource units (which may be specifically a time domain resource, mapped by the uplink reference signal, in each of the plurality of aggregate uplink time domain resource units).

For example, the user equipment may determine, based on the time domain resource, mapped by the uplink reference signal, in each of the plurality of aggregate uplink time domain resource units, the time domain resource, mapped by the uplink reference signal, in the uplink time domain resource unit, to determine the time domain resource, mapped by the uplink reference signal, in each of the plurality of aggregate uplink time domain resource units.

For example, the user equipment may determine, based on a time domain resource, mapped by the uplink reference signal, in one (which may be, for example, the first one) of the plurality of aggregate uplink time domain resource units and based on a first correspondence, the time domain resource, mapped by the uplink reference signal, in each of the plurality of aggregate uplink time domain resource units. The first correspondence may be a correspondence between the time domain resource, mapped by the uplink reference signal, in the uplink time domain resource unit (which is, for example, the first one mentioned above) of the plurality of aggregate uplink time domain resource units and a time domain resource, mapped by the uplink reference signal, in another uplink time domain resource unit other than the uplink time domain resource unit of the plurality of aggregate uplink time domain resource units.

In scenario 3, for the downlink reference signal, a process of determining, by the user equipment, the time domain resource mapped by the downlink reference signal is described in detail in the following case 2 (of determining the time domain resource mapped by the downlink reference signal). Details are not described herein.

Optionally, in this embodiment, the second configuration information sent by the base station may be information sent by the base station after a central control unit sends the second configuration information to the base station. To be specific, the base station may receive the time domain resource, mapped by the reference signal, in the at least one of the plurality of aggregate uplink time domain resource units and/or the quantity of aggregate uplink time domain resource units that are/is sent by the central control unit, and send the time domain resource, mapped by the reference signal, in the at least one of the plurality of aggregate uplink time domain resource units and/or the quantity of aggregate uplink time domain resource units.

Optionally, in this embodiment of the present invention, the second configuration information may be sent by the base station by using at least one of broadcast information, higher layer signaling, and control channel information.

For example, the broadcast information may be a master information block (main information block, MIB), or a system information block (system information block, SIB); the higher layer signaling may be radio resource control (radio resource control, RRC) signaling; the control channel information may be downlink control information. The downlink control information may be control information or common control channel information (for example, a physical control format indicator channel (physical control format indicator channel, PCFICH) in a Long Term Evolution (long term evolution, LTE) system) carried on a physical downlink control channel (physical downlink control channel, PDCCH).

Optionally, in this embodiment of the present invention, the second configuration information may be sent by the base station by using the foregoing existing information and/or signaling, or sent by the base station by using newly set signaling and/or information. Specifically, a manner of sending the second configuration information may be determined according to an actual use requirement, and is not limited in this embodiment of the present invention.

The base station can send the second configuration information to the user equipment in at least one of the foregoing manners. Therefore, in this embodiment of the present invention, the base station can send the second configuration information to the user equipment more flexibly.

S102. The user equipment sends, on the time domain resource, the uplink reference signal to a base station.

Optionally, in this embodiment of the present invention, the foregoing S102 may be specifically implemented by sending, by the user equipment, the uplink time domain resource unit to the base station. For example, the user equipment may map the uplink reference signal to a corresponding time domain resource in the uplink time domain resource unit, and send the uplink time domain resource unit to the base station.

S103. The base station determines the time domain resource mapped by the uplink reference signal.

Optionally, the base station may determine, based on the predefined first configuration information, the time domain resource mapped by the uplink reference signal.

Specifically, for detailed descriptions about the predefined first configuration information and about the determining, by the base station based on the predefined first configuration information, the time domain resource mapped by the uplink reference signal, refer to descriptions about the predefined first configuration information and about the determining, by the user equipment based on the predefined first configuration information, the time domain resource mapped by the uplink reference signal in the foregoing S101. Details are not described herein again.

Optionally, in this embodiment of the present invention, the base station may determine, based on the attribute of the uplink time domain resource unit, the manner of mapping the uplink reference signal to the time domain resource. In other words, the base station may determine, based on the attribute of the uplink time domain resource unit, the manner of mapping the uplink reference signal to the time domain resource. The attribute of the uplink time domain resource unit may include at least one of the following: the index of the uplink time domain resource unit, the set number of the uplink time domain resource unit, and the type of the uplink time domain resource unit.

Optionally, in this embodiment of the present invention, the index of the uplink time domain resource unit may be a sequence number of the index of the uplink time domain resource unit; the set number of the uplink time domain resource unit may be a sequence number of the set number of the uplink time domain resource unit; and the type of the uplink time domain resource unit may be a sequence number of the type of the uplink time domain resource unit.

Optionally, in this embodiment of the present invention, the attribute of the uplink time domain resource unit includes at least the first attribute and the second attribute. The method for determining, by the base station based on an attribute of the uplink time domain resource unit, a manner of mapping the reference signal to the time domain resource may specifically include:

determining, by the base station based on the first attribute, that the manner of mapping the uplink reference signal to the time domain resource is: determining, by the base station based on the predefined first configuration information, the time domain resource mapped by the uplink reference signal.

Further, the method for determining a time domain resource mapped by a reference signal provided in this embodiment of the present invention further includes: sending, by the base station, second configuration information to the user equipment, where the second configuration information is used by the user equipment to determine the time domain resource mapped by the uplink reference signal and/or the subcarrier spacing of the uplink reference signal.

For detailed descriptions about the second configuration information and about the determining, by the base station based on the first attribute, the manner of mapping the uplink reference signal to the time domain resource, refer to descriptions about the second configuration information and about the determining, by the user equipment based on the first attribute, the manner of mapping the uplink reference signal to the time domain resource in the foregoing S101. Details are not described herein again.

It should be noted that, an execution order between S103 and S101 may not be restricted in this embodiment of the present invention. To be specific, in this embodiment of the present invention, S101 may be performed first and then S103 is performed; or S103 may be performed first and then S101 is performed; or S101 and S103 may be performed simultaneously.

An execution order between S103 and S102 may not be restricted in this embodiment of the present invention, either. To be specific, in this embodiment of the present invention, S102 may be performed first and then S103 is performed; or S103 may be performed first and then S102 is performed; or S102 and S103 may be performed simultaneously.

S104. The base station receives, on the time domain resource, the uplink reference signal.

Optionally, after determining the time domain resource mapped by the uplink reference signal, the base station may receive the uplink reference signal based on the time domain resource mapped by the uplink reference signal. In other words, the base station receives, on the time domain resource, the uplink reference signal.

It should be noted that, in this embodiment of the present invention, the time domain resource determined by the base station in the foregoing S104 is the same as the time domain resource determined by the user equipment in the foregoing S102. In this way, it can be ensured that the base station accurately receives the uplink reference signal sent by the user equipment.

Optionally, in this embodiment of the present invention, the foregoing S104 may be specifically implemented by receiving, by the base station, the uplink time domain resource unit sent by the user equipment. For example, the user equipment maps the uplink reference signal to a corresponding time domain resource in the uplink time domain resource unit, and sends the uplink time domain resource unit to the base station. To be specific, after receiving the uplink time domain resource unit sent by the user equipment, the base station may parse out the uplink reference signal from the corresponding time domain resource in the uplink time domain resource unit.

According to the method for determining a time domain resource mapped by a reference signal provided in this embodiment of the present invention, the user equipment may determine, based on the configuration information, the time domain resource mapped by the uplink reference signal, and send, on the time domain resource, the uplink reference signal to the base station, and the base station determines the time domain resource mapped by the uplink reference signal, and receives, on the time domain resource, the uplink reference signal. Therefore, when user equipments and base stations of the two adjacent cells all determine, according to the method for determining a time domain resource mapped by a reference signal provided in this embodiment of the present invention, the time domain resource mapped by the uplink reference signal, uplink reference signals of the two adjacent cells can be mapped to a same time domain resource. To be specific, interference does not occur between uplink data and an uplink reference signal of one cell in the two adjacent cells and those of the other cell in the two adjacent cells. In this way, it can be ensured that the base stations of the two adjacent cells correctly demodulate the uplink reference signal.

Figure 6:
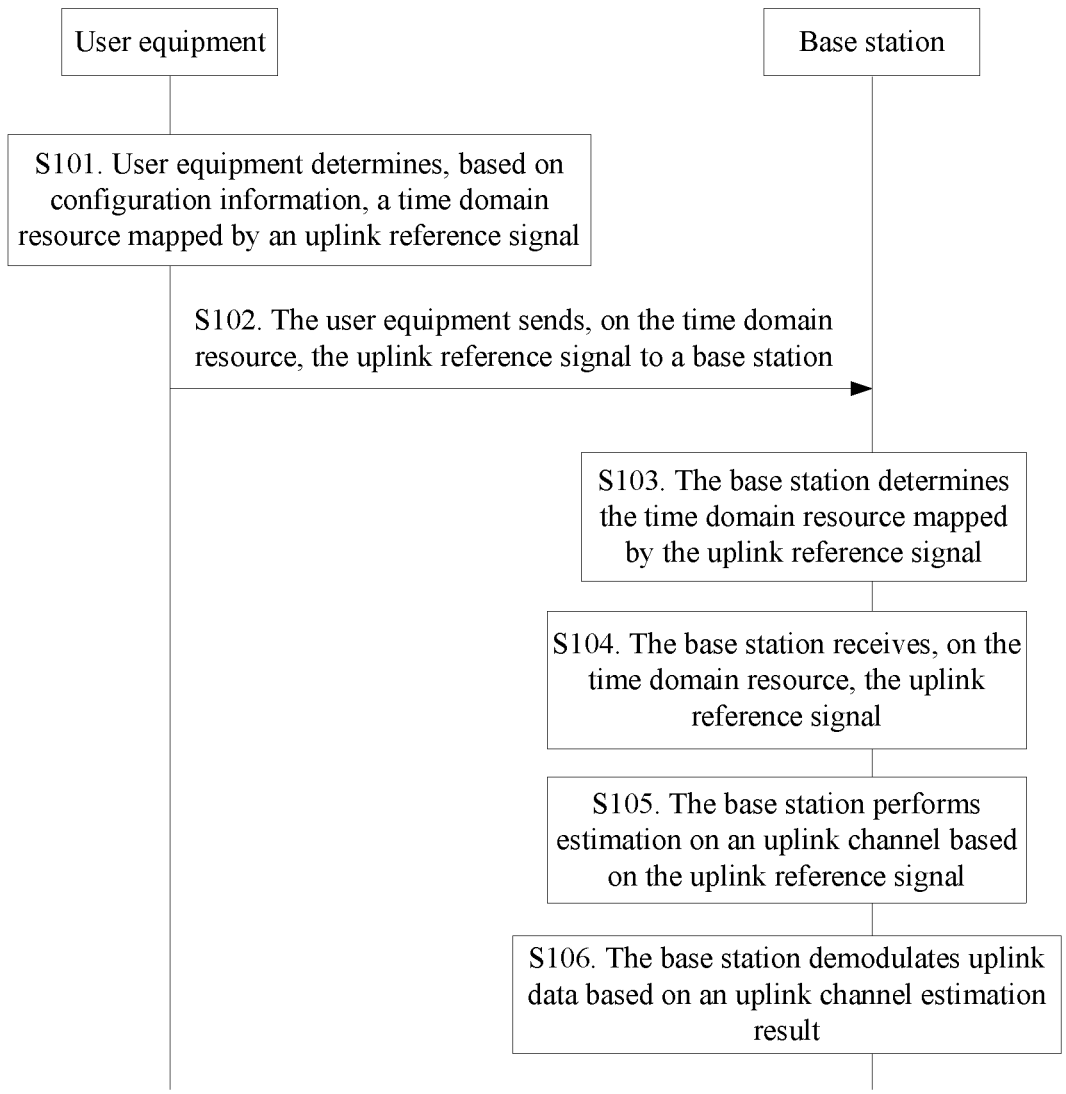
FIG. 6 is a schematic diagram 2 of a method for determining a time domain resource mapped by a reference signal according to an embodiment of the present invention.

Optionally, with reference to FIG. 4, as shown in FIG. 6, after the foregoing S104, the method for determining a time domain resource mapped by a reference signal provided in this embodiment of the present invention may further include S105 and S106:

S105. The base station performs estimation on an uplink channel based on the uplink reference signal.

S106. The base station demodulates uplink data based on an uplink channel estimation result.

In this embodiment of the present invention, after receiving the uplink time domain resource unit (for example, the uplink time domain resource unit shown in FIG. 5) sent by the user equipment, the base station may parse out the uplink reference signal (for example, the uplink reference signal shown in FIG. 5) from the corresponding time domain resource in the uplink time domain resource unit, and then the base station may perform estimation on the uplink channel based on the uplink reference signal, and demodulate the uplink data (for example, the uplink data shown in FIG. 5) in the uplink time domain resource unit based on the obtained uplink channel estimation result.

According to the method for determining a time domain resource mapped by a reference signal provided in this embodiment of the present invention, after receiving the uplink reference signal sent by the user equipment, the base station may perform estimation on the uplink channel based on the uplink reference signal, and demodulate the uplink data based on the uplink channel estimation result. Therefore, when the user equipments and the base stations of the two adjacent cells all determine, according to the method for determining a time domain resource mapped by a reference signal provided in this embodiment of the present invention, the time domain resource mapped by the uplink reference signal, uplink reference signals of the two adjacent cells can be mapped to a same time domain resource. To be specific, interference does not occur between uplink data and an uplink reference signal of one cell in the two adjacent cells and those of the other cell in the two adjacent cells. In this way, the uplink reference signal can be correctly demodulated, ensuring a relatively accurate result when estimation is performed on the uplink channel based on the uplink reference signal, so that the uplink data can be correctly demodulated.

In this embodiment of the present invention, after the user equipment sends the uplink time domain resource unit to the base station, after a timing advance (timing advanced, TA), the base station may send the downlink time domain resource unit to the user equipment. In this case, even if the user equipments and the base stations of the two adjacent cells all determine, according to the method for determining a time domain resource mapped by a reference signal provided in this embodiment of the present invention, the time domain resource mapped by the uplink reference signal, an uplink reference signal of one cell in the two adjacent cells and a downlink reference signal of the other cell may be mapped to different time domain resources, causing interference between a reference signal and data of one cell in the two adjacent cells and those of the other cell in the two adjacent cells.

Figure 7:
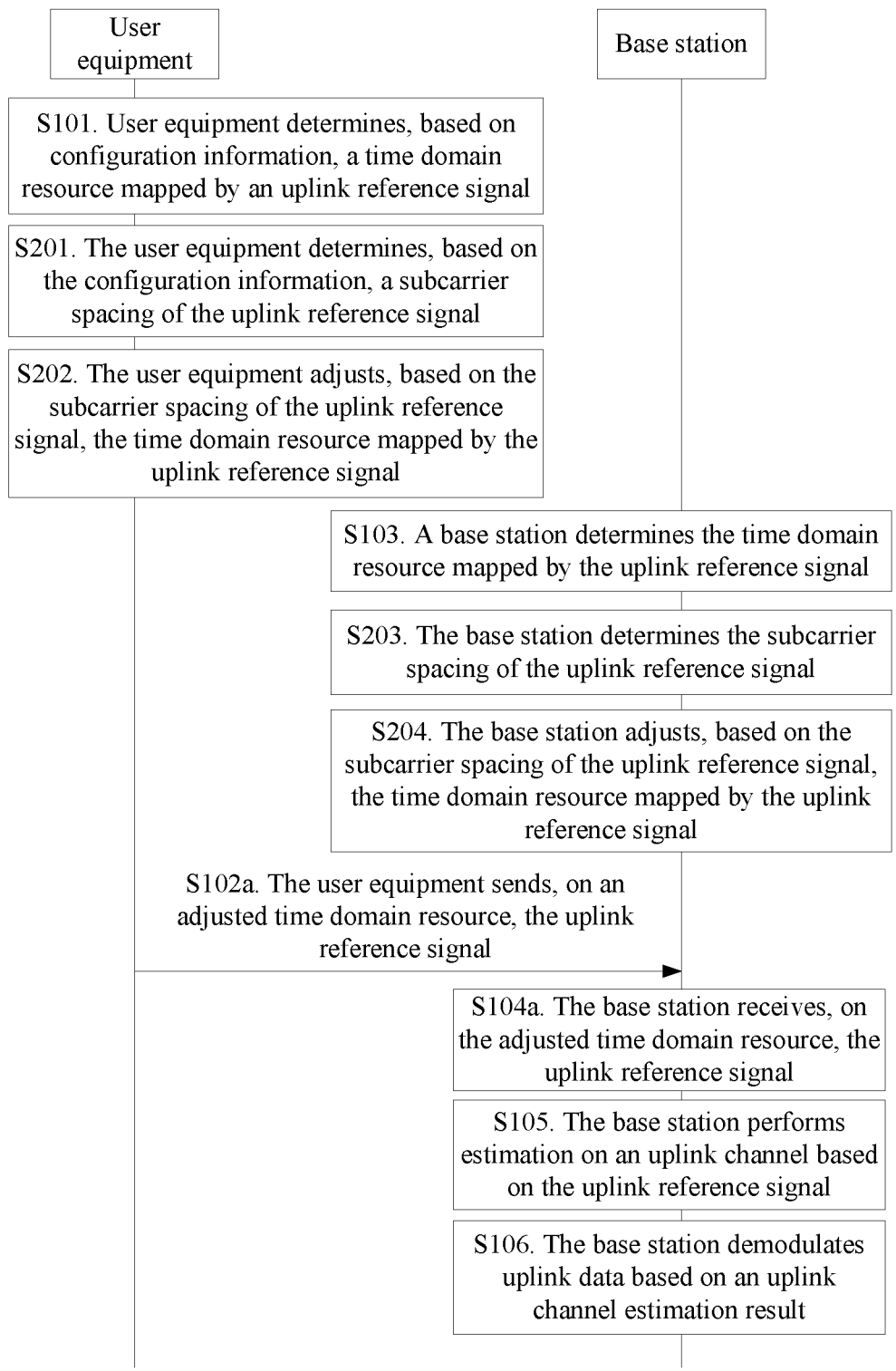
FIG. 7 is a schematic diagram 3 of a method for determining a time domain resource mapped by a reference signal according to an embodiment of the present invention.

To resolve the foregoing problem, optionally, with reference to FIG. 6, as shown in FIG. 7, before S102, the method for determining a time domain resource mapped by a reference signal provided in this embodiment of the present invention may further include the following steps S201 and S202.

S201. The user equipment determines a subcarrier spacing of the uplink reference signal based on the configuration information.

S202. The user equipment adjusts, based on the subcarrier spacing of the uplink reference signal, the time domain resource mapped by the uplink reference signal.

For example, assuming that a generally used subcarrier spacing of an uplink time domain resource unit is 15 kilohertz (KHz), in this case, the subcarrier spacing of the uplink reference signal may be set to 30 kilohertz (KHz). In other words, the time domain resource mapped by the uplink reference signal (for example, the position of the symbol, mapped by the uplink reference signal, in the uplink time domain resource unit) is shortened to a half of an original length. In addition, after the time domain resource mapped by the uplink reference signal is adjusted and shortened, to an extent, an uplink reference signal of one cell in two adjacent cells and a downlink reference signal of the other cell can be mapped to a same time domain resource as much as possible, so that interference between a reference signal and data of one cell in the two adjacent cells and those of the other cell in the two adjacent cells can be reduced or canceled as much as possible.

Correspondingly, as shown in FIG. 7, S102 in FIG. 6 may be specifically replaced with the following S102a.

S102a. The user equipment sends, on an adjusted time domain resource, the uplink reference signal.

Optionally, a manner of sending, by the user equipment on the adjusted time domain resource, the uplink reference signal is the same as the manner of sending, by the user equipment on the determined time domain resource (namely, the time domain resource before adjustment), the uplink reference signal in the foregoing S102. Specifically, for detailed descriptions about the manner of sending, by the user equipment on the adjusted time domain resource, the uplink reference signal, refer to descriptions about the manner of sending, by the user equipment on the determined time domain resource, the uplink reference signal in the foregoing S102. Details are not described herein again.

Optionally, in this embodiment of the present invention, the configuration information may be the predefined first configuration information and/or the second configuration information sent by the base station, and the configuration information includes at least the subcarrier spacing of the uplink reference signal. In this case, the foregoing S201 in FIG. 7 may be replaced with the following S201a.

S201a. The user equipment determines the subcarrier spacing of the uplink reference signal based on the subcarrier spacing of the uplink reference signal.

Further, as shown in FIG. 7, before S104, the method for determining a time domain resource mapped by a reference signal provided in this embodiment of the present invention may further include S203 and S204.

S203. The base station determines the subcarrier spacing of the uplink reference signal.

S204. The base station adjusts, based on the subcarrier spacing of the uplink reference signal, the time domain resource mapped by the uplink reference signal.

Correspondingly, as shown in FIG. 7, S104 in FIG. 6 may be specifically replaced with the following S104a.

S104a. The base station receives, on the adjusted time domain resource, the uplink reference signal.

Optionally, the method for adjusting, by the base station based on the subcarrier spacing of the uplink reference signal, the time domain resource mapped by the uplink reference signal is the same as the method for adjusting, by the user equipment based on the subcarrier spacing of the uplink reference signal, the time domain resource mapped by the uplink reference signal. For details about the method for adjusting, by the base station, the time domain resource of the uplink reference signal based on the subcarrier spacing of the uplink reference signal, refer to descriptions about the method for adjusting, by the user equipment, the time domain resource of the uplink reference signal based on the subcarrier spacing of the uplink reference signal in the foregoing S202. Details are not described herein again.

It should be noted that, according to the method for determining a time domain resource mapped by a reference signal provided in this embodiment of the present invention, the foregoing S201 to S204 may alternatively be performed independently. To be specific, the foregoing S201 to S204 are not performed based on the foregoing S101 to S104. For example, assuming that generally an uplink reference signal of one cell in the two adjacent cells and a downlink reference signal of the other cell are mapped to different time domain resources, S201 to S204 may be performed to adjust the time domain resource mapped by the uplink reference signal of one cell in the two adjacent cells, so that the uplink reference signal of one cell in the two adjacent cells and the downlink reference signal of the other cell are mapped to a same time domain resource as much as possible, and interference between a reference signal and data of one cell in the two adjacent cells and those of the other cell in the two adjacent cells can be reduced or canceled as much as possible.

Case 2: Determine a Time Domain Resource Mapped by a Downlink Reference Signal

Figure 8:
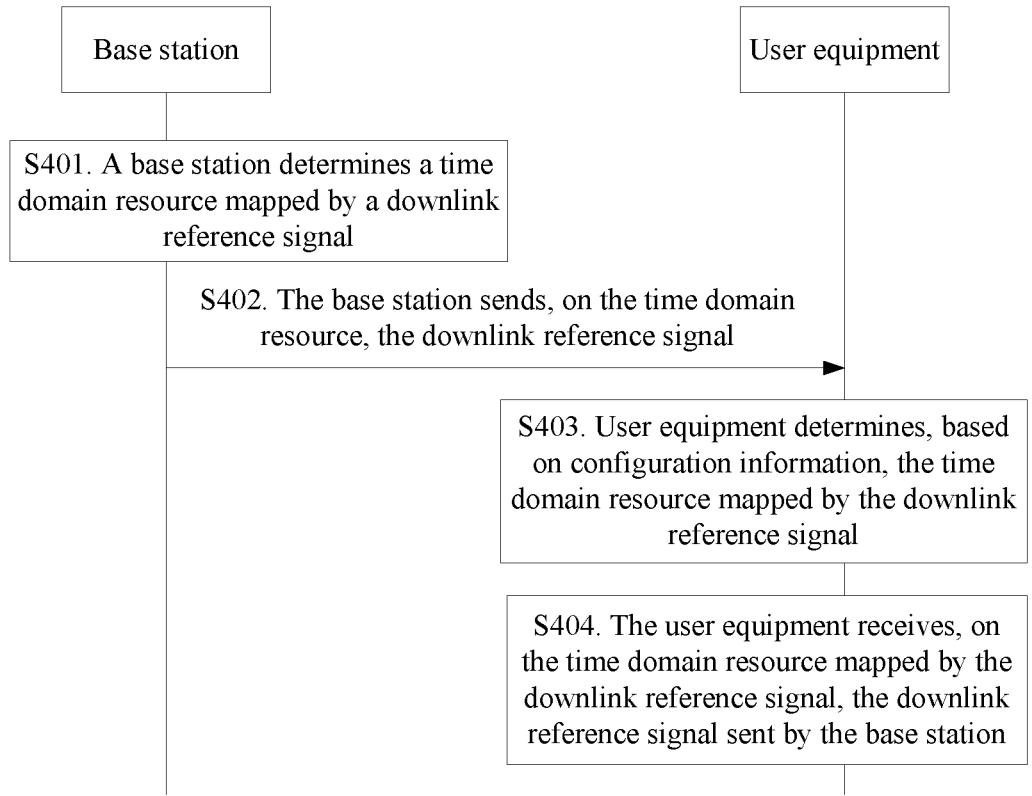
FIG. 8 is a schematic diagram 4 of a method for determining a time domain resource mapped by a reference signal according to an embodiment of the present invention.

As shown in FIG. 8, an embodiment of the present invention provides a method for determining a time domain resource mapped by a reference signal, and the method is a method for determining a time domain resource mapped by a downlink reference signal. The method may include the following S401 to S404.

S401. A base station determines a time domain resource mapped by a downlink reference signal.

Optionally, the base station may determine, based on predefined first configuration information, the time domain resource mapped by the downlink reference signal.

Specifically, the base station may determine, based on a time domain resource mapped by a predefined downlink reference signal, the time domain resource mapped by the downlink reference signal. To be specific, the base station may directly learn, based on the predefined first configuration information (the predefined first configuration information includes the time domain resource mapped by the predefined downlink reference signal), the time domain resource mapped by the downlink reference signal.

In this embodiment of the present invention, the time domain resource mapped by the downlink reference signal is a position of a symbol, mapped by the downlink reference signal, in a downlink time domain resource unit.

Optionally, in this embodiment of the present invention, the time domain resource mapped by the downlink reference signal may include one of the following: a time domain symbol index mapped by the downlink reference signal; an offset of the downlink reference signal relative to a start time domain position of a data channel, and an offset of the downlink reference signal relative to a start time domain position of a control channel.

In this embodiment of the present invention, the time domain symbol index mapped by the downlink reference signal, the offset of the downlink reference signal relative to the start time domain position of the data channel, and the offset of the downlink reference signal relative to the start time domain position of the control channel are respectively similar to the time domain symbol index mapped by the uplink reference signal, the offset of the uplink reference signal relative to the start time domain position of the data channel, and the offset of the uplink reference signal relative to the start time domain position of the control channel. For the detailed descriptions about the time domain symbol index mapped by the downlink reference signal, the offset of the downlink reference signal relative to the start time domain position of the data channel, and the offset of the downlink reference signal relative to the start time domain position of the control channel, refer to the descriptions about the time domain symbol index mapped by the uplink reference signal, the offset of the uplink reference signal relative to the start time domain position of the data channel, and the offset of the uplink reference signal relative to the start time domain position of the control channel in the foregoing S101. Details are not described herein again.

Figure 9:
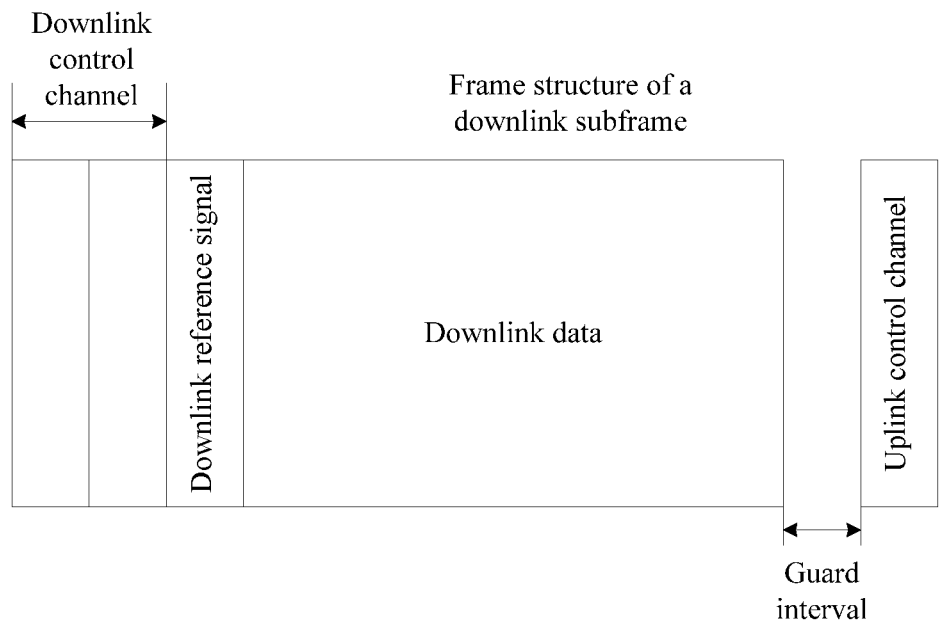
FIG. 9 is a schematic diagram of a frame structure of a downlink subframe according to an embodiment of the present invention.

It should be noted that, in this embodiment of the present invention, the downlink time domain resource unit may be a downlink subframe, a downlink slot, or a downlink minislot. The downlink time domain resource unit may also be a downlink time domain resource unit of another form, and this is not limited in this embodiment of the present invention. That the downlink time domain resource unit is a downlink subframe is used as an example. FIG. 9 shows a schematic diagram of a frame structure of a downlink subframe. The downlink subframe includes a downlink control channel, the downlink reference signal, downlink data, a guard interval, and an uplink control channel.

Optionally, in this embodiment of the present invention, the base station may determine, based on an attribute of the downlink time domain resource unit, a manner of mapping the downlink reference signal to the time domain resource. In other words, the base station may determine, based on the attribute of the downlink time domain resource unit, the manner of mapping the downlink reference signal to the time domain resource. The determining, by user equipment, the manner of mapping the downlink reference signal to the time domain resource may include: determining, by the base station based on the predefined first configuration information, the time domain resource mapped by the downlink reference signal.

The attribute of the downlink time domain resource unit may include at least one of the following: an index of the downlink time domain resource unit, a set number of the downlink time domain resource unit, and a type of the downlink time domain resource unit.

Optionally, in this embodiment of the present invention, the index of the downlink time domain resource unit may be a sequence number of the index of the downlink time domain resource unit; the set number of the downlink time domain resource unit may be a sequence number of the set number of the downlink time domain resource unit; and the type of the downlink time domain resource unit may be a sequence number of the type of the downlink time domain resource unit.

In this embodiment of the present invention, the index of the downlink time domain resource unit, the set number of the downlink time domain resource unit, and the type of the downlink time domain resource unit respectively correspond to the index of the uplink time domain resource unit, the set number of the uplink time domain resource unit, and the type of the uplink time domain resource unit. For detailed descriptions about the index of the downlink time domain resource unit, the set number of the downlink time domain resource unit, and the type of the downlink time domain resource unit, refer to the descriptions about the index of the uplink time domain resource unit, the set number of the uplink time domain resource unit, and the type of the uplink time domain resource unit in the foregoing S101. Details are not described herein again.

Correspondingly, the sequence number of the index of the downlink time domain resource unit, the sequence number of the set number of the downlink time domain resource unit, and the sequence number of the type of the downlink time domain resource unit respectively correspond to the sequence number of the index of the uplink time domain resource unit, the sequence number of the set number of the uplink time domain resource unit, and the sequence number of the type of the uplink time domain resource unit. For detailed descriptions about the sequence number of the index of the downlink time domain resource unit, the sequence number of the set number of the downlink time domain resource unit, and the sequence number of the type of the downlink time domain resource unit, refer to the descriptions about the sequence number of the index of the uplink time domain resource unit, the sequence number of the set number of the uplink time domain resource unit, and the sequence number of the type of the uplink time domain resource unit in the foregoing S101. Details are not described herein again.

Optionally, in this embodiment of the present invention, the attribute of the downlink time domain resource unit includes at least a first attribute and a second attribute. The method for determining, by the base station based on an attribute of the downlink time domain resource unit, a manner of mapping the reference signal to the time domain resource may specifically include:

determining, by the base station based on the first attribute, that the manner of mapping the downlink reference signal to the time domain resource is: determining, by the base station based on the predefined first configuration information, the time domain resource mapped by the downlink reference signal.

Further, the method for determining a time domain resource mapped by a reference signal provided in this embodiment of the present invention further includes: sending, by the base station, second configuration information to the user equipment, where the second configuration information is used by the user equipment to determine the time domain resource mapped by the uplink reference signal and/or a subcarrier spacing of the uplink reference signal.

For detailed descriptions about the second configuration information and about the determining, by the base station based on the first attribute, the manner of mapping the downlink reference signal to the time domain resource, refer to descriptions about the second configuration information and about the determining, by the user equipment based on the first attribute, the manner of mapping the uplink reference signal to the time domain resource in the foregoing S101. Details are not described herein again.

Further, the method for determining a time domain resource mapped by a reference signal provided in this embodiment of the present invention further includes: sending, by the base station to the user equipment, fourth configuration information used by the user equipment to determine the manner of mapping the downlink reference signal corresponding to the attribute of the downlink time domain resource unit to the time domain resource.

Optionally, in this embodiment of the present invention, the fourth configuration information may be sent by the base station by using at least one of broadcast information, higher layer signaling, and control channel information.

Optionally, in this embodiment of the present invention, the second configuration information and the fourth configuration information may be simultaneously sent by the base station to the user equipment, or may be separately sent by the base station to the user equipment. When the second configuration information and the fourth configuration information are simultaneously sent by the base station to the user equipment, the second configuration information may include the fourth configuration information, and the fourth configuration information may also include the second configuration information. Alternatively, the second configuration information and the fourth configuration information may not be mutually inclusive.

S402. The base station sends, on the time domain resource, the downlink reference signal.

Optionally, in this embodiment of the present invention, the foregoing S402 may be specifically implemented by sending, by the base station, the downlink time domain resource unit to the user equipment. For example, the base station may map the downlink reference signal to a corresponding time domain resource in the downlink time domain resource unit, and send the downlink time domain resource unit to the user equipment.

S403. User equipment determines, based on configuration information, the time domain resource mapped by the downlink reference signal.

For descriptions about the configuration information, refer to related descriptions in the foregoing S101. Details are not described herein again.

Optionally, when the user equipment determines, based on the configuration information, the time domain resource mapped by the downlink reference signal, reference signals related to the configuration information may be the downlink reference signal or the uplink reference signal (for example, a time domain resource mapped by the reference signal related to the configuration information may be a time domain resource mapped by a downlink reference signal or a time domain resource mapped by an uplink reference signal), and time domain resource units related to the configuration information may all be downlink time domain resource units. When the time domain resource mapped by the reference signal related to the configuration information is the time domain resource mapped by the downlink reference signal, the user equipment may directly determine, based on the time domain resource mapped by the downlink reference signal, the time domain resource mapped by the downlink reference signal. When the time domain resource mapped by the reference signal related to the configuration information is the time domain resource mapped by the uplink reference signal, the user equipment needs to determine, based on the time domain resource mapped by the uplink reference signal, the guard interval, and a quantity of symbols of the downlink control channel, the time domain resource mapped by the downlink reference signal. Specifically, the method for determining, by the user equipment based on the time domain resource mapped by the uplink reference signal, the guard interval, and the quantity of symbols of the downlink control channel, the time domain resource mapped by the downlink reference signal is described in detail in the following embodiment. Details are not described herein.

Optionally, in this embodiment of the present invention, the user equipment may determine, based on the attribute of the downlink time domain resource unit, the manner of mapping the downlink reference signal to the time domain resource. In other words, the user equipment may determine, based on the attribute of the downlink time domain resource unit, the manner of mapping the uplink reference signal to the time domain resource. The determining, by the user equipment, a manner of mapping the downlink reference signal to the time domain resource may include: determining, by the user equipment based on the predefined first configuration information and/or the second configuration information sent by the base station, the time domain resource mapped by the downlink reference signal.

The attribute of the downlink time domain resource unit may include at least one of the following: the index of the downlink time domain resource unit, the set number of the downlink time domain resource unit, and the type of the downlink time domain resource unit.

Optionally, in this embodiment of the present invention, the index of the downlink time domain resource unit may be a sequence number of the index of the downlink time domain resource unit; the set number of the downlink time domain resource unit may be a sequence number of the set number of the downlink time domain resource unit; and the type of the downlink time domain resource unit may be a sequence number of the type of the downlink time domain resource unit.

Optionally, in this embodiment of the present invention, the method for determining, by the user equipment based on an attribute of the downlink time domain resource unit, a manner of mapping the downlink reference signal to the time domain resource may include: determining, by the user equipment based on predefined third configuration information and/or fourth configuration information sent by the base station, the manner of mapping the reference signal corresponding to the attribute of the time domain resource unit to the time domain resource. The predefined third configuration information and/or the fourth configuration information sent by the base station may include: a correspondence between the attribute of the downlink time domain resource unit and the manner of mapping the downlink reference signal to the time domain resource.

It should be noted that, in this embodiment of the present invention, the predefined third configuration information and/or the fourth configuration information sent by the base station may be used by the user equipment to determine the manner of mapping the downlink reference signal corresponding to the attribute of the downlink time domain resource unit to the time domain resource.

Optionally, in this embodiment of the present invention, the attribute of the downlink time domain resource unit may include at least the first attribute and the second attribute.

The method for determining, by the user equipment based on an attribute of the downlink time domain resource unit, a manner of mapping the uplink reference signal to the time domain resource may be specifically one of the following:

(c) the user equipment determines, based on the first attribute, that the manner of mapping the reference signal to the time domain resource is: determining, by the user equipment based on the predefined first configuration information, the time domain resource mapped by the downlink reference signal; and (d) the user equipment determines, based on the second attribute, that the manner of mapping the reference signal to the time domain resource is: determining, by the user equipment based on the second configuration information sent by the base station, the time domain resource mapped by the downlink reference signal.

Optionally, in this embodiment of the present invention, the first attribute may indicate that the attribute of the downlink time domain resource unit is a static type, and the second attribute may indicate that the attribute of the downlink time domain resource unit is a dynamic type. For example, when the attribute of the downlink time domain resource unit is the static type, the user equipment may determine, based on the predefined first configuration information, the time domain resource mapped by the downlink reference signal. When the attribute of the downlink time domain resource unit is the dynamic type, the user equipment may determine, based on the second configuration information sent by the base station, the time domain resource mapped by the downlink reference signal.

Specifically, for details about an understanding that the attribute of the time domain resource unit is the static type and an understanding that the attribute of the time domain resource unit is the dynamic type, refer to related descriptions in the foregoing S101. Details are not described herein again.

For example, the following describes in different scenarios (scenario 1, scenario 2, and scenario 3), the method for determining, by the user equipment based on the configuration information, the time domain resource mapped by the downlink reference signal in this embodiment of the present invention.

Scenario 1: Quantities of symbols of downlink control channels of time domain resource units (including the uplink time domain resource unit and the downlink time domain resource unit, for example, an uplink time domain resource unit of one cell in two adjacent cells and a downlink time domain resource unit of the other cell) of the two adjacent cells are the same; or quantities of symbols of downlink control channels of time domain resource units of the two adjacent cells change synchronously.

Optionally, in scenario 1, for the downlink reference signal, the user equipment may determine, based on the predefined first configuration information (the first configuration information may include the time domain resource mapped by the predefined uplink reference signal) and/or the second configuration information sent by the base station (the second configuration information may include the guard interval and the quantity of symbols of the downlink control channel), the time domain resource mapped by the downlink reference signal. For example, the user equipment may determine the downlink reference signal based on the time domain resource mapped by the predefined uplink reference signal, the guard interval, and the quantity of symbols of the downlink control channel. Specifically, the time domain resource mapped by the downlink reference signal may be determined according to a formula s=i+k+n, where i in the formula is the time domain resource mapped by the predefined uplink reference signal (the offset of the uplink reference signal relative to the start time domain position of the data channel), k is the guard interval, n is the quantity of symbols of the downlink control channel, and s is the time domain resource mapped by the downlink reference signal (the offset of the downlink reference signal relative to the start time domain position of the control channel). i, k, and n all are integers greater than or equal to 1, and s is an integer greater than or equal to 3. When i=1, k=1, and n=1, the user equipment may determine, according to the formula s=i+k+n, that the offset of the downlink reference signal relative to the start time domain position of the control channel is 3. In other words, the downlink reference signal is mapped to the third symbol in the downlink time domain resource unit.

Scenario 2: Quantities of symbols of downlink control channels of time domain resource units (including the uplink time domain resource unit and the downlink time domain resource unit, for example, an uplink time domain resource unit of one cell in the two adjacent cells and a downlink time domain resource unit of the other cell) of the two adjacent cells do not change synchronously.

Optionally, in scenario 2, for the downlink reference signal, the second configuration information sent by the base station may include the time domain resource mapped by the downlink reference signal. In this case, the foregoing S403 in FIG. 8 may be replaced with the following S403a.

S403a. User equipment determines, based on the time domain resource mapped by the downlink reference signal, the time domain resource mapped by the downlink reference signal.

Optionally, the time domain resource mapped by the downlink reference signal may be sent by the base station.

Scenario 3: On the basis of scenario 1 or scenario 2, a time domain resource unit of at least one cell in the two adjacent cells (for example, an uplink time domain resource unit of one cell in the two adjacent cells and a downlink time domain resource unit of the other cell) is formed through aggregation of a plurality of uplink time domain resource units (referred to as aggregate uplink time domain resource units below).

Optionally, in scenario 3, for the uplink reference signal, the second configuration information sent by the base station may include a time domain resource, mapped by the downlink reference signal, in at least one of a plurality of aggregate downlink time domain resource units and/or a quantity of aggregate downlink time domain resource units. In this case, the foregoing S403 in FIG. 8 may be replaced with the following S403b.

S403b. User equipment determines, based on a time domain resource, mapped by the downlink reference signal, in at least one of a plurality of aggregate downlink time domain resource units and/or a quantity of aggregate downlink time domain resource units, the time domain resource, mapped by the downlink reference signal, in the plurality of aggregate downlink time domain resource units (which may be specifically a time domain resource, mapped by the downlink reference signal, in each of the plurality of aggregate downlink time domain resource units).

For example, the user equipment may determine, based on the time domain resource, mapped by the downlink reference signal, in the at least one of the plurality of aggregate downlink time domain resource units, the time domain resource mapped by the downlink reference signal in the downlink time domain resource unit, to determine the time domain resource, mapped by the downlink reference signal, in the at least one of the plurality of aggregate downlink time domain resource units.

For example, the user equipment may determine, based on the time domain resource, mapped by the downlink reference signal, in one (which may be, for example, the first one) of the plurality of aggregate downlink time domain resource units, and based on a first correspondence, the time domain resource, mapped by the downlink reference signal, in each of the plurality of aggregate downlink time domain resource units. The first correspondence may be a correspondence between the time domain resource, mapped by the downlink reference signal, in the downlink time domain resource unit (which is, for example, the first one mentioned above) of the plurality of aggregate downlink time domain resource units and a time domain resource, mapped by the downlink reference signal, in another downlink time domain resource unit other than the downlink time domain resource unit of the plurality of aggregate downlink time domain resource units.

Optionally, in this embodiment of the present invention, the configuration information sent by the base station may be information sent by the base station after a central control unit sends the configuration information to the base station. To be specific, the base station may receive the time domain resource, mapped by the reference signal, in the at least one of the plurality of aggregate downlink time domain resource units and/or the quantity of aggregate downlink time domain resource units that are/is sent by the central control unit, and send the time domain resource, mapped by the reference signal, in the at least one of the plurality of aggregate downlink time domain resource units and/or the quantity of aggregate downlink time domain resource units.

Optionally, in this embodiment of the present invention, the second configuration information may be sent by the base station by using at least one of broadcast information, higher layer signaling, and control channel information.

Optionally, in this embodiment of the present invention, the second configuration information may be sent by the base station by using the foregoing existing information and/or signaling, or sent by the base station by using newly set signaling and/or information. Specifically, a manner of sending the second configuration information may be determined according to an actual use requirement, and is not limited in this embodiment of the present invention.

The base station can send the second configuration information to the user equipment in at least one of the foregoing manners. Therefore, in this embodiment of the present invention, the base station can send the second configuration information to the user equipment more flexibly.

It should be noted that, an execution order between S403 and S401 may not be restricted in this embodiment of the present invention. To be specific, in this embodiment of the present invention, S401 may be performed first and then S403 is performed; or S403 may be performed first and then S401 is performed; or S401 and S403 may be performed simultaneously.

An execution order between S403 and S402 may not be restricted in this embodiment of the present invention, either. To be specific, in this embodiment of the present invention, S402 may be performed first and then S403 is performed; or S403 may be performed first and then S402 is performed; or S402 and S403 may be performed simultaneously.

S404. The user equipment receives, on the time domain resource mapped by the downlink reference signal, the downlink reference signal sent by the base station.

Optionally, after determining the time domain resource mapped by the downlink reference signal, the user equipment may receive the downlink reference signal based on the time domain resource mapped by the downlink reference signal. In other words, the user equipment receives, on the time domain resource, the downlink reference signal.

It should be noted that, in this embodiment of the present invention, the time domain resource determined by the user equipment in the foregoing S404 is the same as the time domain resource determined by the base station in the foregoing S402. In this way, it can be ensured that the user equipment accurately receives the downlink reference signal sent by the base station.

Optionally, in this embodiment of the present invention, the foregoing S404 may be specifically implemented by receiving, by the user equipment, the downlink time domain resource unit sent by the base station. For example, the base station maps the downlink reference signal to a corresponding time domain resource in the downlink time domain resource unit, and sends the downlink time domain resource unit to the user equipment. To be specific, after the user equipment receives the downlink time domain resource unit sent by the base station, the base station may parse out the downlink reference signal from the corresponding time domain resource in the downlink time domain resource unit.

According to the method for determining a time domain resource mapped by a reference signal provided in this embodiment of the present invention, the base station can determine the time domain resource mapped by the downlink reference signal, and send, on the time domain resource, the downlink reference signal to the user equipment; and the user equipment can determine, based on the configuration information, the time domain resource mapped by the downlink reference signal, and receive, on the time domain resource, the downlink reference signal. Therefore, when user equipments and base stations of the two adjacent cells all determine, according to the method for determining a time domain resource mapped by a reference signal provided in this embodiment of the present invention, the time domain resource mapped by the downlink reference signal, uplink reference signals of the two adjacent cells can be mapped to a same time domain resource. To be specific, interference does not occur between uplink data and an uplink reference signal of one cell in the two adjacent cells and those of the other cell in the two adjacent cells. In this way, it can be ensured that the base stations of the two adjacent cells correctly demodulate the uplink reference signal.

Figure 10:
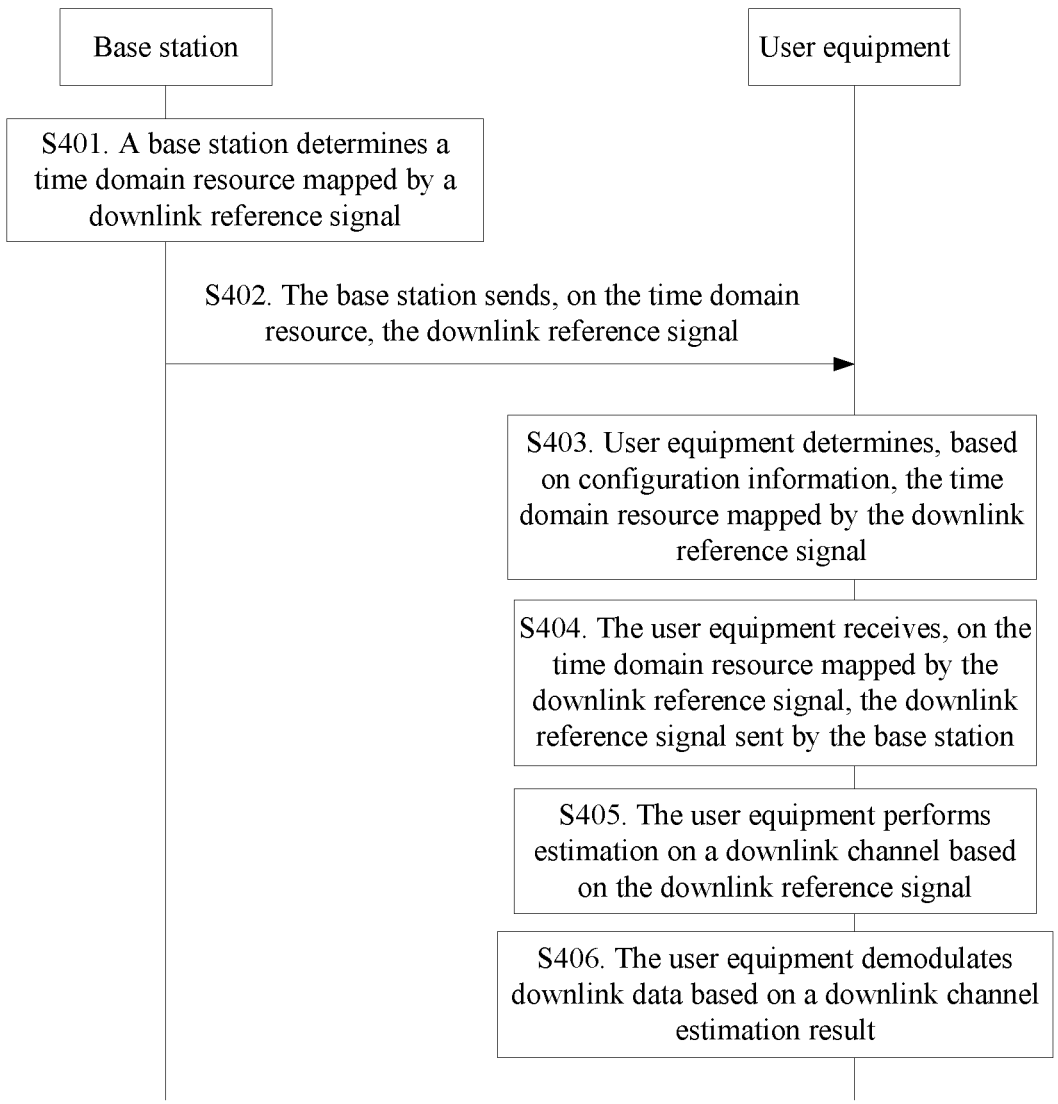
FIG. 10 is a schematic diagram 5 of a method for determining a time domain resource mapped by a reference signal according to an embodiment of the present invention.

Optionally, with reference to FIG. 8, as shown in FIG. 10, after the foregoing S404, the method for determining a time domain resource mapped by a reference signal provided in this embodiment of the present invention may further include S405 and S406.

S405. The user equipment performs estimation on a downlink channel based on the downlink reference signal.

S406. The user equipment demodulates downlink data based on a downlink channel estimation result.

In this embodiment of the present invention, after receiving the downlink time domain resource unit (for example, the downlink time domain resource unit shown in FIG. 9) sent by the base station, the user equipment parses out the downlink reference signal (for example, the downlink reference signal shown in FIG. 9) from a corresponding time domain resource in the downlink time domain resource unit, and then the user equipment performs estimation on the downlink channel based on the downlink reference signal, and demodulates uplink data (for example, the downlink data shown in FIG. 9) in an uplink time domain resource unit based on the obtained downlink channel estimation result.

According to the method for determining a time domain resource mapped by a reference signal provided in this embodiment of the present invention, after receiving the downlink reference signal sent by the base station, the user equipment may perform estimation on the downlink channel based on the downlink reference signal, and demodulate the downlink data based on the downlink channel estimation result. Therefore, when user equipments and base stations of two adjacent cells all determine, according to the method for determining a time domain resource mapped by a reference signal provided in this embodiment of the present invention, the time domain resource mapped by the downlink reference signal, downlink reference signals of the two adjacent cells can be mapped to a same time domain resource. To be specific, interference does not occur between downlink data and a downlink reference signal of one cell in the two adjacent cells and those of the other cell in the two adjacent cells. In this way, the downlink reference signal can be correctly demodulated, ensuring a relatively accurate result when estimation is performed on the downlink channel based on the downlink reference signal, so that the downlink data can be correctly demodulated.

In this embodiment of the present invention, after the user equipment sends the uplink time domain resource unit to the base station, after a timing advance (timing advanced, TA), the base station may send the downlink time domain resource unit to the user equipment. In this case, even if the user equipments and the base stations of the two adjacent cells all determine, according to the method for determining a time domain resource mapped by a reference signal provided in this embodiment of the present invention, the time domain resource mapped by the downlink reference signal, an uplink reference signal of one cell in the two adjacent cells and a downlink reference signal of the other cell may be mapped to different time domain resources, causing interference between a reference signal and data of one cell in the two adjacent cells and those of the other cell in the two adjacent cells.

Figure 11:
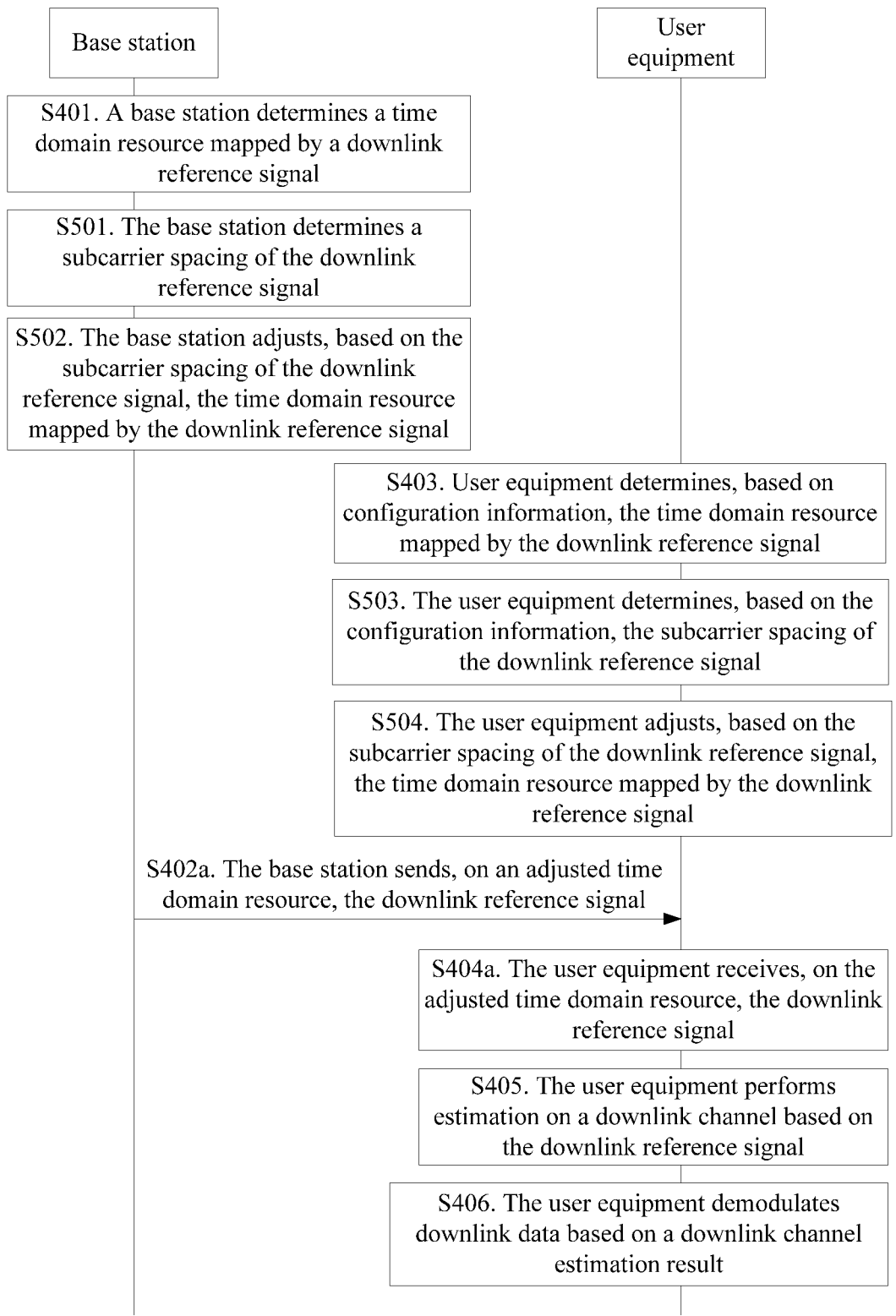
FIG. 11 is a schematic diagram 6 of a method for determining a time domain resource mapped by a reference signal according to an embodiment of the present invention.

To resolve the foregoing problem, optionally, with reference to FIG. 10, as shown in FIG. 11, before S402, the method for determining a time domain resource mapped by a reference signal provided in this embodiment of the present invention may further include the following steps S501 and S502.

S501. The base station determines a subcarrier spacing of the downlink reference signal.

S502. The base station adjusts, based on the subcarrier spacing of the downlink reference signal, the time domain resource mapped by the downlink reference signal.

For example, assuming that a generally used subcarrier spacing of a downlink time domain resource unit is 15 kilohertz (KHz), in this case, the subcarrier spacing of the downlink reference signal may be set to 30 kilohertz (KHz). In other words, the time domain resource mapped by the downlink reference signal (for example, the position of the symbol, mapped by the downlink reference signal, in the downlink time domain resource unit) is shortened to a half of an original length. In addition, after the time domain resource mapped by the downlink reference signal is adjusted and shortened, to an extent, an uplink reference signal of one cell in two adjacent cells and a downlink reference signal of the other cell can be mapped to a same time domain resource as much as possible, so that interference between a reference signal and data of one cell in the two adjacent cells and those of the other cell in the two adjacent cells can be reduced or canceled as much as possible.

Correspondingly, as shown in FIG. 11, S402 in FIG. 10 may be specifically replaced with the following S402a.

S402a. The base station sends, on an adjusted time domain resource, the downlink reference signal.

Optionally, a manner of sending, by the base station on the adjusted time domain resource, the downlink reference signal is the same as the manner of sending, by the base station on the determined time domain resource (namely, the time domain resource before adjustment), the downlink reference signal in the foregoing S402. Specifically, for detailed descriptions about the manner of sending, by the base station on the adjusted time domain resource, the downlink reference signal, refer to descriptions about the manner of sending, by the base station on the determined time domain resource, the downlink reference signal in the foregoing S402. Details are not described herein again.

Further, as shown in FIG. 11, before S404, the method for determining a time domain resource mapped by a reference signal provided in this embodiment of the present invention may further include S503 and S504.

S503. The user equipment determines the subcarrier spacing of the downlink reference signal based on configuration information.

S504. The user equipment adjusts, based on the subcarrier spacing of the downlink reference signal, the time domain resource mapped by the downlink reference signal.

Correspondingly, as shown in FIG. 11, S404 in FIG. 10 may be specifically replaced with the following S404a.

S404a. The user equipment receives, on the adjusted time domain resource, the downlink reference signal.

Optionally, in this embodiment of the present invention, the configuration information may be predefined first configuration information and/or second configuration information sent by the base station, and the configuration information may include at least the subcarrier spacing of the downlink reference signal. In this case, the foregoing S503 in FIG. 11 may be replaced with the following S503a.

S503a. The user equipment determines the subcarrier spacing of the downlink reference signal based on the subcarrier spacing of the downlink reference signal.

Optionally, the method for adjusting, by the user equipment based on the subcarrier spacing of the downlink reference signal, the time domain resource mapped by the downlink reference signal is the same as the method for adjusting, by the base station based on the subcarrier spacing of the downlink reference signal, the time domain resource mapped by the downlink reference signal. For details about the method for adjusting, by the user equipment based on the subcarrier spacing of the downlink reference signal, the time domain resource of the downlink reference signal, refer to descriptions about the method for adjusting, by the base station based on the subcarrier spacing of the downlink reference signal, the time domain resource of the downlink reference signal in the foregoing S502. Details are not described herein again.

It should be noted that, according to the method for determining a time domain resource mapped by a reference signal provided in this embodiment of the present invention, S501 to S504 may alternatively be performed independently. To be specific, the foregoing S501 to S504 are not performed on the basis of the foregoing S401 to S404. For example, assuming that generally an uplink reference signal of one cell in the two adjacent cells and a downlink reference signal of the other cell are mapped to different time domain resources, S501 to S504 may be performed to adjust the time domain resource mapped by the downlink reference signal of one cell in the two adjacent cells, so that an uplink reference signal of one cell in the two adjacent cells and a downlink reference signal of the other cell are mapped to a same time domain resource as much as possible, and interference between a reference signal and data of one cell in the two adjacent cells and those of the other cell in the two adjacent cells can be reduced or canceled as much as possible.

With reference to case 1 (namely, determining a time domain resource mapped by an uplink reference signal) and case 2 (namely, determining a time domain resource mapped by a downlink reference signal), when user equipments and base stations of the two adjacent cells all determine, according to the method for determining a time domain resource mapped by a reference signal provided in this embodiment of the present invention, the time domain resource mapped by the uplink reference signal and the time domain resource mapped by the downlink reference signal, the uplink reference signal and the downlink reference signal of the two adjacent cells can be mapped to a same time domain resource. To be specific, interference does not occur between data and a reference signal of one cell in the two adjacent cells and those of the other cell in the two adjacent cells. In this way, it can be ensured that the base stations and the user equipments of the two adjacent cells all correctly demodulate the reference signals. In addition, a relatively accurate result is obtained after estimation is performed on a channel based on the reference signal, so that data can be correctly demodulated.

The foregoing mainly describes the solutions in the embodiments of the present invention from a perspective of interaction between network elements. It may be understood that, to implement the foregoing functions, the network elements such as the base stations and the user equipments include a corresponding hardware structure and/or software module for performing the functions. A person of ordinary skill in the art should easily be aware that, in combination with example units and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of the present invention, division of function modules may be performed on the base station and the user equipment according to the foregoing method embodiments. For example, the function modules may be divided to correspond to the functions, or two or more functions may be integrated into a processing module. The integrated module may be implemented in a form of hardware, or may be implemented in a form of a software function module. It should be noted that the module division in the embodiments of the present invention is an example, and is merely logical function division and may be other division in actual implementation.

Figure 12:
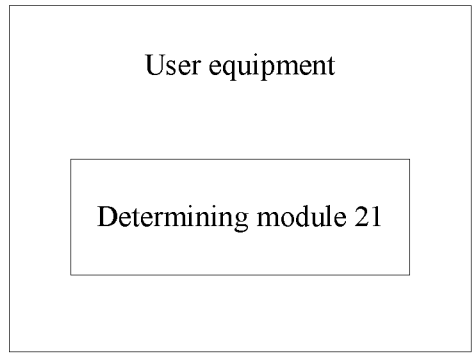
FIG. 12 is a schematic structural diagram 1 of user equipment according to an embodiment of the present invention.

For example, if the function modules are divided to correspond to the functions, a schematic structural diagram of user equipment provided in an embodiment of the present invention is shown in FIG. 12. In FIG. 12, the user equipment includes at least a determining module 21. Optionally, the user equipment further includes a receiving module and a sending module.

The determining module 21 is configured to support the user equipment in performing S101, S201, S202, S403, S405, S406, S503, and S504 in the foregoing method embodiments. The receiving module is configured to support the user equipment in performing S404 (including S404a) in the foregoing method embodiments. The sending module is configured to support the user equipment in performing S102 (including S102a) in the foregoing method embodiments.

The determining module 21, the receiving module, and the sending module may be further configured to perform other processes of the technologies described in this specification.

It should be noted that, related content of steps in the foregoing method embodiments can be quoted in function descriptions about corresponding function modules, and details are not described herein again.

Figure 13:
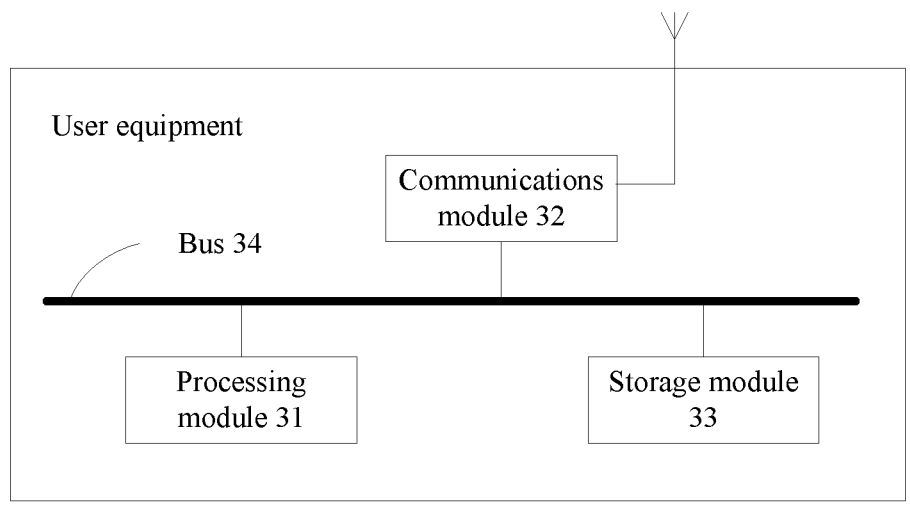
FIG. 13 is a schematic structural diagram 2 of user equipment according to an embodiment of the present invention.

For example, if integrated units are used, a schematic structural diagram of user equipment provided in an embodiment of the present invention is shown in FIG. 13. In FIG. 13, the user equipment includes: a processing module 31 and a communications module 32. The processing module 31 is configured to control and manage actions of the user equipment, for example, perform the steps performed by the determining module 21, and/or is configured to perform other processes of the technologies described in this specification. The communications module 32 is configured to support interaction between the user equipment and another device, for example, perform the steps performed by the receiving module and the sending module. As shown in FIG. 13, the user equipment may further include a storage module 33 and a bus 34, and the storage module 33 is configured to store program code and data of the user equipment.

The processing module 31 may be a processor or a controller in the user equipment, where the processor or the controller may be the processor 11 of the mobile phone shown in FIG. 3, and the processor or the controller can implement or perform various example logical blocks, modules, and circuits described with reference to content disclosed in this application. The processor or controller may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or a combination thereof. The controller/processor may implement or perform various example logical blocks, modules, and circuits described with reference to content disclosed in this application. Alternatively, the processor may be a combination of processors for implementing a computing function, for example, a combination of one or more microprocessors, or a combination of the DSP and a microprocessor.

The communications module 32 may be a transceiver, a transceiver circuit, a communications interface, or the like in the user equipment, and the transceiver, the transceiver circuit, the communications interface, or the like may be the RF circuit 12 of the mobile phone shown in FIG. 3.

The storage module 33 may be a memory or the like in a terminal device, and the memory may be the memory 14 of the mobile phone shown in FIG. 3. The memory may include a volatile memory (volatile memory) such as a random access memory (random access memory, RAM). The memory may further include a non-volatile memory (non-volatile memory) such as a read-only memory (read-only memory, ROM), a flash memory (flash memory), a hard disk drive (hard disk drive, HDD), or a solid-state drive (solid-state drive, SSD). The memory may further include a combination of the foregoing types of memories.

The bus 34 may be a Peripheral Component Interconnect (peripheral component interconnect, PCI) bus, an Extended Industry Standard Architecture (extended industry standard architecture, EISA) bus, or the like. The bus 34 may be classified into an address bus, a data bus, a control bus, and the like. For ease of representation, only one thick line is used to represent the bus in FIG. 13, but this does not mean that there is only one bus or only one type of bus.

An embodiment of the present invention further provides a computer readable storage medium, and the computer readable storage medium stores one or more programs, where the one or more programs include a computer executable instruction. When the processor or the controller of the foregoing user equipment performs the computer executable instruction, the user equipment performs steps performed by the user equipment in the method procedures in the foregoing method embodiments.

Figure 14:
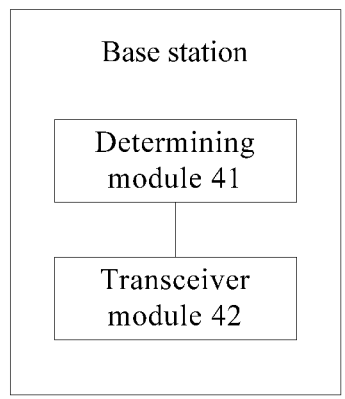
FIG. 14 is a schematic structural diagram 1 of a base station according to an embodiment of the present invention.

For example, if function modules are divided to correspond to the functions, a schematic structural diagram of a base station provided in an embodiment of the present invention is shown in FIG. 14. In FIG. 14, the base station includes a determining module 41 and a transceiver module 42.

The determining module 41 is configured to support the base station in performing S103, S105, S106, S203, S204, S401, S501, and S502 in the foregoing method embodiments. The transceiver module 42 is configured to support the base station in performing S104 (including S104a) and S402 (including S402a) in the foregoing method embodiments.

The determining module 41 and the transceiver module 42 may be further configured to perform other processes of the technologies described in this specification.

It should be noted that, related content of steps in the foregoing method embodiments can be quoted in function descriptions about corresponding function modules, and details are not described herein again.

Figure 15:
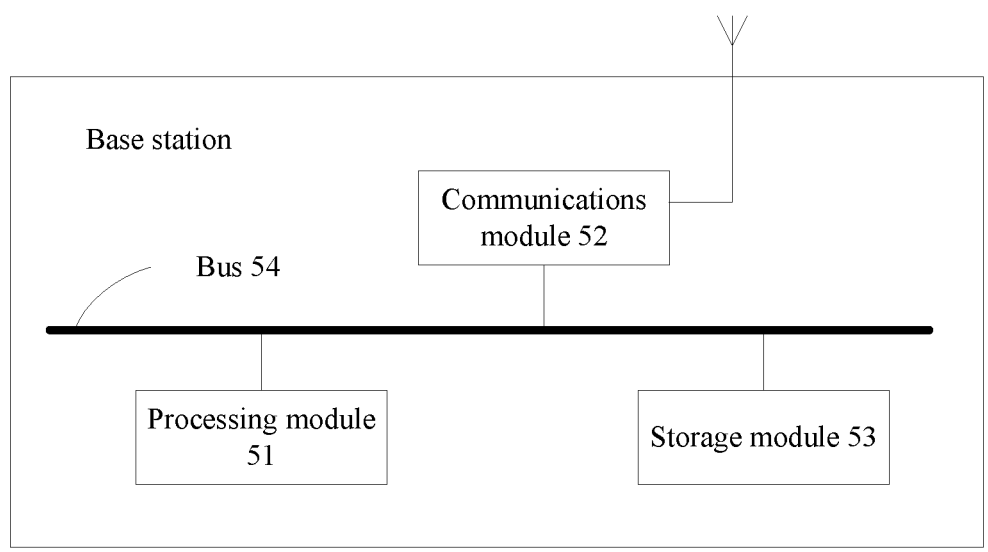
FIG. 15 is a schematic structural diagram 2 of a base station according to an embodiment of the present invention.

For example, if integrated units are used, a schematic structural diagram of a base station provided in an embodiment of the present invention is shown in FIG. 15. In FIG. 15, the base station includes: a processing module 51 and a communications module 52. The processing module 51 is configured to control and manage actions of the base station, for example, perform the steps performed by the determining module 41, and/or is configured to perform other processes of the technologies described in this specification. The communications module 52 is configured to support interaction between the base station and another device, for example, perform the steps performed by the transceiver module 42. As shown in FIG. 15, the base station may further include a storage module 53 and a bus 54, and the storage module 53 is configured to store program code and data of the base station.

The processing module 51 may be a processor or a controller in user equipment, where the processor or the controller may be the baseband processing unit of the base station shown in FIG. 2, and the processor or the controller can implement or perform various example logical blocks, modules, and circuits described with reference to content disclosed in this application. The processor or controller may be a CPU, a general-purpose processor, a DSP, an ASIC, an FPGA or another programmable logic device, a transistor logic device, a hardware component, or any combination thereof. The controller/processor may implement or perform various example logical blocks, modules, and circuits described with reference to content disclosed in this application. Alternatively, the processor may be a combination of processors for implementing a computing function, for example, a combination of one or more microprocessors, or a combination of the DSP and a microprocessor.

The communications module 52 may be a transceiver, a transceiver circuit, a communications interface, or the like in the base station, and the transceiver, the transceiver circuit, the communications interface, or the like may be the antenna of the base station shown in FIG. 2.

The storage module 53 may be a memory of the base station, or the like. The memory may include a volatile memory such as a RAM. The memory may further include a non-volatile memory such as a ROM, a flash memory, an HDD, or an SSD. The memory may further include a combination of the foregoing types of memories.

The bus 54 may be a PCI bus, an EISA bus, or the like. The bus 54 may be classified into an address bus, a data bus, a control bus, and the like. For ease of representation, only one thick line is used to represent the bus in FIG. 15, but this does not mean that there is only one bus or only one type of bus.

An embodiment of the present invention further provides a computer readable storage medium, and the computer readable storage medium stores one or more programs, where the one or more programs include a computer executable instruction. When a processor or a controller of a base station executes the computer executable instruction, the base station performs steps performed by the base station in the method procedures in the foregoing method embodiments.

An embodiment of the present invention provides a wireless communications system, and the wireless communications system may include: user equipment and a base station. For a network architecture of the wireless communications system provided in this embodiment of the present invention, refer to the schematic architectural diagram of the wireless communications system shown in FIG. 1. The user equipment may be the user equipment shown in FIG. 1, and the base station may be the base station shown in FIG. 1. For detailed descriptions about the base station and the user equipment, refer to related descriptions in the foregoing method embodiments and apparatus embodiments. Details are not described herein again.

According to the wireless communications system provided in this embodiment of the present invention, when user equipments and base stations in two adjacent cells all determine, according to the method for determining a time domain resource mapped by a reference signal provided in the foregoing method embodiments, a time domain resource mapped by an uplink reference signal and a time domain resource mapped by a downlink reference signal, the uplink reference signal and the downlink reference signal in two adjacent cells can be mapped to a same time domain resource. To be specific, interference does not occur between data and a reference signal of one cell in the two adjacent cells and those of the other cell in the two adjacent cells. In this way, it can be ensured that the base stations and the user equipments of the two adjacent cells all correctly demodulate the reference signals. In addition, a relatively accurate result is obtained after estimation is performed on a channel based on the reference signal, so that data can be correctly demodulated.

Method or algorithm steps described in combination with the content disclosed in this application may be implemented by hardware, or may be implemented by a processor by executing a software instruction. The software instruction may include a corresponding software module. The software module may be stored in a RAM, a flash memory, a ROM, an erasable programmable read only memory (erasable programmable ROM, EPROM), an electrically erasable programmable read only memory (electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC.

The foregoing descriptions about implementations enable a person skilled in the art to understand that, for convenient and brief description, division of the function modules is used as an example for illustration. In actual application, the foregoing functions can be allocated to different function modules for implementation according to a requirement. In other words, an internal structure of an apparatus is divided into different function modules to implement all or some of the functions described above. For a detailed working process of the system, apparatus, and units described above, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely used as an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. Indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to an actual requirement, to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a time domain resource mapped by a reference signal, the method comprising:
   determining, by a first user equipment of a first cell based on configuration information, a time domain resource of the first cell mapped by at least one of a reference signal or a subcarrier spacing of the reference signal, wherein the configuration information comprises at least one of predefined first configuration information or second configuration information received from a first base station of the first cell, wherein a time domain resource of a second cell that is adjacent to the first cell and includes a second user equipment is the same as the time domain resource of the first cell, wherein one of the time domain resource of the first cell and the time domain resource of the second cell is for uplink (UL) and the other is for downlink (DL); and
   sending, by the first user equipment, the time domain resource of the first cell to the first base station.

2. The method according to claim 1, further comprising:
   determining, by the first user equipment based on an attribute of a time domain resource unit, a manner of mapping the reference signal to the time domain resource of the first cell, wherein the manner of mapping the reference signal comprises:
   determining, by the first user equipment based on at least one of the predefined first configuration information or the second configuration information received from the first base station, the time domain resource of the first cell mapped by the reference signal;
   wherein the attribute of the time domain resource unit comprises at least one of the following: an index of the time domain resource unit, a set number of the time domain resource unit, or a type of the time domain resource unit.

3. The method according to claim 2, wherein the manner of mapping the reference signal further comprises:
   determining, by the first user equipment based on at least one of predefined third configuration information or fourth configuration information received from the first base station, the manner of mapping the reference signal corresponding to the attribute of the time domain resource unit to the time domain resource of the first cell.

4. The method according to claim 2,
   wherein the attribute of the time domain resource unit comprises at least a first attribute and a second attribute; and
   wherein the manner of mapping the reference signal to the time domain resource further comprises:
   determining, by the first user equipment based on the first attribute, that the manner is: determining, by the first user equipment based on the predefined first configuration information, the time domain resource of the first cell mapped by the reference signal; or
   determining, by the first user equipment based on the second attribute, that the manner is: determining, by the first user equipment based on the second configuration information received from the first base station, the time domain resource of the first cell mapped by the reference signal.

5. The method according to claim 1, wherein the configuration information comprises at least one of the following: a guard interval, a start time domain position of a control channel in a time domain resource unit, a start time domain position of a data channel in the time domain resource unit, a quantity of symbols of a downlink control channel, the time domain resource mapped by the reference signal, the subcarrier spacing of the reference signal, a quantity of aggregate time domain resource units, or a time domain resource mapped by the reference signal in at least one of a plurality of aggregate time domain resource units.

6. The method according to claim 5, further comprising:
   determining, by the first user equipment based on a time domain resource mapped by a predefined uplink reference signal, a time domain resource mapped by an uplink reference signal; and
   determining, by the first user equipment based on at least one of the predefined first configuration information or the second configuration information received from the first base station, a time domain resource mapped by a downlink reference signal, wherein at least one of the predefined first configuration information or the second configuration information received from the first base station comprises at least one of the following: the guard interval, the start time domain position of the control channel in the time domain resource unit, the start time domain position of the data channel in the time domain resource unit, and the quantity of symbols of the downlink control channel.

43

7. The method according to claim 5,
wherein the second configuration information received from the first base station comprises the time domain resource mapped by the reference signal; and
wherein the method further comprises:
determining, by the first user equipment based on the time domain resource mapped by the reference signal, the time domain resource of the first cell.

8. The method according to claim 5,
wherein at least one of the predefined first configuration information or the second configuration information received from the first base station comprises the subcarrier spacing of the reference signal.

9. A user equipment of a first cell, the user equipment comprising:
a memory storing instructions; and
a processor configured to execute the instructions to implement:
determining, based on configuration information, a time domain resource of the first cell mapped by at least one of a reference signal or a subcarrier spacing of the reference signal, wherein the configuration information comprises at least one of predefined first configuration information or second configuration information received from a first base station of the first cell, wherein a time domain resource of a second cell that is adjacent to the first cell and includes a second user equipment is the same as the time domain resource of the first cell, wherein one of the time domain resource of the first cell and the time domain resource of the second cell is for uplink (UL) and the other is for downlink (DL): and
sending the time domain resource of the first cell to the first base station.

10. The user equipment according to claim 9, wherein executing the instructions further causes the processor to implement:
determining, based on an attribute of a time domain resource unit, a manner of mapping the reference signal to the time domain resource of the first cell, wherein the manner of mapping the reference signal comprises:
determining, based on at least one of the predefined first configuration information or the second configuration information received from the first base station of the first cell, the time domain resource of the first cell mapped by the reference signal;
wherein the attribute of the time domain resource unit comprises at least one of the following: an index of the time domain resource unit, a set number of the time domain resource unit, or a type of the time domain resource unit.

11. The user equipment according to claim 10, wherein the manner of mapping the reference signal further comprises:
determining, based on at least one of predefined third configuration information or fourth configuration information received from the first base station, the manner of mapping the reference signal corresponding to the attribute of the time domain resource unit to the time domain resource of the first cell.

12. The user equipment according to claim 10,
wherein the attribute of the time domain resource unit comprises at least a first attribute and a second attribute; and
wherein the manner of mapping the reference signal further comprises:

44 determining, based on the first attribute, that the manner is: determining, based on the predefined first configuration information, the time domain resource of the first cell mapped by the reference signal; or
determining, determine, based on the second attribute, that the manner is:
determining, based on the second configuration information received from the first base station, the time domain resource of the first cell mapped by the reference signal.

13. The user equipment according to claim 9, wherein the configuration information comprises at least one of the following: a guard interval, a start time domain position of a control channel in the time domain resource unit, a start time domain position of a data channel in the time domain resource unit, a quantity of symbols of a downlink control channel, the time domain resource mapped by the reference signal, the subcarrier spacing of the reference signal, a quantity of aggregate time domain resource units, or a time domain resource mapped by the reference signal in at least one of a plurality of aggregate time domain resource units.

14. The user equipment according to claim 13,
wherein the second configuration information received from the first base station comprises the time domain resource mapped by the reference signal; and
wherein executing the instructions further causes the processor to implement:
determining, based on the time domain resource mapped by the reference signal, the time domain resource of the first cell.

15. The user equipment according to claim 13,
wherein at least one of the predefined first configuration information or the second configuration information received from the base station of the first cell comprises the subcarrier spacing of the reference signal.

16. A base station of a first cell, the base station comprising:
a memory storing instructions;
a processor configured to execute the instructions to implement:
determining a time domain resource of the first cell mapped by at least one of a reference signal or a subcarrier spacing of the reference signal, wherein a time domain resource of a second cell that is adjacent to the first cell and includes a second base station is the same as the time domain resource of the first cell, wherein one of the time domain resource of the first cell and the time domain resource of the second cell is for uplink (UL) and the other is for downlink (DL); and
a transceiver configured to send or receive the reference signal based on the time domain resource of the first cell mapped by at least one of the reference signal or the subcarrier spacing of the reference signal.

17. The base station according to claim 16, wherein executing the instructions further causes the processor to implement:
determining, based on an attribute of a time domain resource unit, a manner of mapping the reference signal to the time domain resource of the first cell, wherein the attribute of the time domain resource unit comprises at least one of the following: an index of the time domain resource unit, a set number of the time domain resource unit, or a type of the time domain resource unit.

18. The base station according to claim 17,
wherein the transceiver is further configured to send fourth configuration information to a user equipment of the first cell, wherein the fourth configuration information is used by the user equipment of the first cell to determine the manner of mapping the reference signal corresponding to the attribute of the time domain resource unit to the time domain resource of the first cell.

19. The base station according to claim 17, wherein the attribute of the time domain resource unit comprises at least a first attribute;
wherein executing the instructions further causes the processor to implement:
determining, the determining module is configured to determine, based on the first attribute, that the manner is: determining, based on predefined first configuration information, the time domain resource of the first cell mapped by the reference signal; and
wherein the transceiver is further configured to send second configuration information to the user equipment, wherein the second configuration information is used by the user equipment of the first cell to determine the time domain resource of the first cell mapped by at least one of the reference signal or the subcarrier spacing of the reference signal.

20. The base station according to claim 19, wherein the second configuration information comprises at least one of the following: a guard interval, a start time domain position of a control channel in a time domain resource unit, a start time domain position of a data channel in the time domain resource unit, a quantity of symbols of a downlink control channel, the time domain resource mapped by the reference signal, the subcarrier spacing of the reference signal, a quantity of aggregate time domain resource units, or a time domain resource mapped by the reference signal in at least one of a plurality of aggregate time domain resource units.

21. The base station according to claim 20,
wherein the second configuration information comprises: the time domain resource of the first cell mapped by the reference signal; and
wherein the second configuration information is used by the user equipment of the first cell to determine the time domain resource of the first cell mapped by the reference signal.

22. The base station according to claim 20,
wherein the second configuration information comprises: the subcarrier spacing of the reference signal; and the second configuration information is used by the user equipment of the first cell to determine the subcarrier spacing of the reference signal.

* * * * *

UNITED STATES PATENT AND TRADEMARK OFFICE
CERTIFICATE OF CORRECTION

| | |
|---|---|
| PATENT NO. | : 10,925,038 B2 |
| APPLICATION NO. | : 16/401740 |
| DATED | : February 16, 2021 |
| INVENTOR(S) | : Wu et al. |

It is certified that error appears in the above-identified patent and that said Letters Patent is hereby corrected as shown below:

In the Claims

Claim 4, Column 42, Line 27-28: "mapping the reference signal to the time domain resource further comprises:" should read -- mapping the reference signal further comprises: --.

Claim 9, Column 43, Line 33: "(DL):" should read -- (DL); --.

Claim 12, Column 44, Line 5: "determining, determine, based" should read -- determining, based --.

Claim 19, Column 45, Line 12-13: "determining, the determining module is configured to determine, based" should read -- determining, based --.

Signed and Sealed this
Twelfth Day of July, 2022

Katherine Kelly Vidal
*Director of the United States Patent and Trademark Office*